United States Patent
Silverman et al.

(10) Patent No.: US 8,339,270 B2
(45) Date of Patent: Dec. 25, 2012

(54) ELECTRICAL GROUND PROTECTION DEVICE, CIRCUIT TESTER AND METHOD OF CIRCUIT CONDITION DETECTION

(75) Inventors: Arthur A. Silverman, Pittsburgh, PA (US); Anton D. Pfeiffer, Ambridge, PA (US)

(73) Assignee: General Wire Spring Company, Pittsburgh, PA (US)

( * ) Notice: Subject to any disclaimer, the term of this patent is extended or adjusted under 35 U.S.C. 154(b) by 217 days.

(21) Appl. No.: 12/004,701

(22) Filed: Dec. 21, 2007

(65) Prior Publication Data
US 2009/0160663 A1 Jun. 25, 2009

(51) Int. Cl.
*G08B 21/00* (2006.01)

(52) U.S. Cl. ........ 340/650; 340/540; 340/635; 340/657; 340/658; 340/659; 340/660; 340/661; 340/662; 324/500; 324/508; 324/509; 324/512; 324/521; 324/522; 324/524; 361/42; 361/54; 361/88

(58) Field of Classification Search .................... 340/650
See application file for complete search history.

(56) References Cited

U.S. PATENT DOCUMENTS

| | | | | | |
|---|---|---|---|---|---|
| 3,800,214 | A | * | 3/1974 | O'Flynn | 324/508 |
| 3,836,844 | A | * | 9/1974 | Prugh | 324/508 |
| 3,967,195 | A | | 6/1976 | Averitt et al. | |
| 4,023,073 | A | * | 5/1977 | Georgi | 361/45 |
| 4,164,702 | A | * | 8/1979 | Pereda | 324/508 |
| 4,626,834 | A | * | 12/1986 | Caruthers | 340/649 |
| 4,843,514 | A | * | 6/1989 | Bodkin | |
| 5,367,250 | A | * | 11/1994 | Whisenand | 324/133 |
| 5,606,480 | A | | 2/1997 | Nevo | |
| 5,642,052 | A | * | 6/1997 | Earle | 324/556 |
| 5,754,114 | A | | 5/1998 | Gnadt | |
| 6,023,400 | A | | 2/2000 | Nevo | |
| 6,975,491 | B2 | | 12/2005 | Silverman | |
| 7,091,871 | B2 | | 8/2006 | Howell et al. | |
| 7,136,267 | B2 | | 11/2006 | Silverman | |
| 7,400,476 | B1 | * | 7/2008 | Hull, Jr. | 361/42 |
| 2005/0168893 | A1 | * | 8/2005 | Silverman | 361/42 |
| 2005/0212526 | A1 | * | 9/2005 | Blades | 324/543 |
| 2006/0017446 | A1 | * | 1/2006 | Howell et al. | 324/509 |
| 2006/0195733 | A1 | * | 8/2006 | DeHaven | 714/724 |
| 2007/0285266 | A1 | * | 12/2007 | Angle et al. | 340/638 |
| 2008/0043387 | A1 | * | 2/2008 | Weil | 361/42 |
| 2009/0045817 | A1 | * | 2/2009 | Savicki et al. | 324/508 |

OTHER PUBLICATIONS

Blue Sea Systems, Current Flow in 120/240 Volt AC Systems, http://bluesea.cokm/viewresource/86. 2006.*

* cited by examiner

*Primary Examiner* — Benjamin C Lee
*Assistant Examiner* — Curtis King
(74) *Attorney, Agent, or Firm* — Metz Lewis Brodman Must O'Keefe LLC; Barry I. Friedman

(57) ABSTRACT

An apparatus and method for protecting against electrocution hazards that arise when an appliance is electrically connected to a miswired single-phase AC electrical source which includes an energized ground lead are described. The apparatus includes one or more sensors that detect electrical energy in the ground lead combined with a miswiring condition in the hot and common leads. A tester embodiment is also illustrated. The method includes the steps of detecting if the putative ground of the electrical source is energized and whether the hot and common leads are reversed.

14 Claims, 13 Drawing Sheets

ELECTRICAL GROUND PROTECTION DEVICE, CIRCUIT TESTER AND METHOD OF CIRCUIT CONDITION DETECTION

BACKGROUND OF THE INVENTION

1. Field of the Invention

The present invention relates to an apparatus and method for providing protection against an electrocution hazard in an appliance arising from a miswiring condition in an electrical source that is to electrically supply the appliance. In particular, the present invention provides such protection where the polarity of the two main leads are reversed and the putative ground line of the electrical supply is improperly electrically charged or is not properly connected.

2. Description of the Related Art

Modern single-phase, alternating current (AC) electrical wiring employs a three wire or line configuration. A first wire is an ungrounded conductor that is commonly referred to as the "hot" wire. A second wire is a grounded conductor that is commonly referred to as the "neutral" wire. The third wire is a grounding conductor that is commonly referred to as the "ground" wire. The ground wire is typically a bare wire, whereas the hot and neutral wires are sheathed in color-coded insulation, the hot wire insulation typically being black and the neutral wire insulation typically being white.

Despite these conventions, miswirings occur with alarming frequency, especially where the wiring has been installed by an inexperienced person, such as a homeowner. A miswiring may occur at an electrical outlet, at the electrical panel to which the electrical outlet is connected, or somewhere between the electrical outlet and the electrical panel, for example, at a switch or at a connection or work box. The miswiring may consist of the swapping of two or all three of the wires, a failure to connect a wire properly, or the omission of a wire.

Simple testing devices which plug into an electrical outlet can be used to determine if an electrical outlet is correctly wired. An example of such a tester is described in U.S. Pat. No. 3,967,195 to Averitt et al. issued Jun. 29, 1976, which is incorporated herein by reference. These testing devices typically employ the various on-off lighting combinations of a set of three lights to indicate whether the electrical outlet is correctly wired or if wires have been switched or are unconnected. However, the same inexperience or incorrect installation work that causes an electrical outlet to be incorrectly wired in the first place may also result in the failure to test the electrical outlet for correctness. Even when an electrical outlet is tested for correct wiring upon installation, later changes to the wiring in the electrical panel or in work boxes between the electrical outlet and the electrical panel can result in the electrical outlet being effectively miswired. Most importantly, however, a certain wiring configuration has been discovered which creates an unsafe condition but is not detected by standard testers.

The most common miswiring condition is the swapping of the two insulated wires, that is, the hot and neutral wires. Due to the nature of single-phase AC power, many lamps and appliances plugged into an electrical outlet in which the hot and neutral wires have been swapped will operate, nonetheless. However, if the lamp or appliance is not double-insulated or is not grounded, for example, by a grounding wire of the lamp or appliance being electrically connected to the ground wire terminal of the electrical outlet, the lamp or appliance could be an electrocution hazard for a person who comes into simultaneous contact with the lamp or appliance and a true electrical ground. The availability of ground fault interrupter devices, as are well known in the art, has reduced the frequency of injuries resulting from this problem. However, the use of ground fault interrupter devices on electrical outlets is far from universal, the ground fault interrupter devices themselves must be periodically checked to determine if they are in working order and under certain conditions, the interrupter will not detect a hazardous condition.

A much less common, but potentially lethal, electrical miswiring problem is the swapping of the hot wire and the ground wire in a three lead plug connection. This results in the ground blade receptacle of the electrical outlet being electrically hot. Appliances and lamps plugged into an electrical outlet in which the hot and ground wires have been swapped will not operate. Although this inoperativeness signals that a problem exists, it does not identify what the problem is. The user may initially misdiagnose the problem as being with the appliance or electrical panel or an intermediate switch rather than with the electrical outlet. However, the user may be electrocuted before he discovers the true cause of the problem or even the fact that a problem exists. The grounding wire on the appliance or lamp side of the electrical outlet is typically attached to the portions of the appliance or lamp with which the user can be expected come into contact, which for simplicity of expression are referred to herein as the housing of the appliance or lamp. A grounding wire properly connected to the housing is intended to shunt any voltage leaking to the housing to an electrical ground through the ground wire. When the ground wire of the electrical outlet is correctly wired, this arrangement prevents a dangerous voltage difference from existing between the housing and electrical ground voltage and so protects a user from being electrocuted who simultaneously comes in contact with the housing and an electrical ground.

However, where the hot and ground wires have been swapped in an electrical outlet, the ground wire becomes electrically energized or live with the AC voltage the hot wire was intended to have, for example, 120 VAC. This causes the ground wire of an appliance or lamp plugged into such an electrical outlet to conduct this high voltage potential to the housing of the appliance or lamp. Anyone who comes into simultaneous contact with the electrified housing of the appliance or lamp and an electrical ground may be electrocuted. This hazard is particularly acute where the appliance or lamp is one that is intended for use in or near water, for example, water pumps, drain cleaners, and certain work lamps.

Moreover, it is also possible for an electrical outlet to have an electrically energized ground wire connected to its ground blade receptacle, but have no connections to the blade receptacles that are normally connected to the hot and neutral wires. In such a case, none of the lights of a common three-light tester will light, thus suggesting that either the hot wire is not connected in the electrical outlet or that there is no power to the electrical outlet, for example, because the power has been disconnected by a breaker, fuse or switch or that the electrical outlet has not yet been wired. Nonetheless, unless the person making the test takes immediate action to correct the problem or to post some kind of warning against use of the electrical outlet, a second person having no knowledge of the test may attempt to use the electrical outlet with deadly results.

The omission of a ground wire connection to an electrical outlet also presents an electrocution hazard. For instance, where the ground receptacle of an electrical outlet is not electrically connected to a ground line, any electrical short between the hot wire and the ground receptacle may result in the ground receptacle becoming electrically energized. Although a fuse or circuit breaker usually protects against electrical shorts, there is no protection in this case because the absence of a ground line connection prevents there from being any current flow due to the electrical short until a person or some other conductor completes the circuit to ground and then it may be too late. Such an electrical short may occur if an uninsulated portion of the hot wire comes into contact with either a portion of the ground receptacle or, where the electrical box containing the electrical outlet is metal, any portion of the electrical box. This might happen, for example, if an insulating twist on wire connector on the hot wire gets dislodged when the wires are pushed back into the electrical box during the installation of the electrical outlet or if too much insulation was stripped away from the end of the hot wire to make a connection leaving a portion of the hot wire exposed. Where the electrical box is metal, it too may become electrically energized under these circumstances.

Additionally, where there is no shorting of the hot wire to the neutral receptacle, the omission of a ground wire connection to the electrical outlet is a particularly insidious problem because the person who plugs an appliance or lamp having a three-prong plug into an electrical outlet having a three-prong receptacle expects that the electrical outlet will electrically ground the appliance or lamp. Where the ground wire in the electrical outlet is missing or unconnected, the sense of security the user gets is not only false, but is potentially lethal.

Most importantly, however, is the situation in which the hot and neutral wires have been switched and the ground is either missing or shunted to the putative neutral conductor. In many older homes, a two prong electrical outlet is utilized. In many cases, the ground for the receptacle is merely shunted or connected to the neutral conductor. In other cases, even in a three prong receptacle installation, the ground conductor may be merely shunted to the putative neutral conductor, rather than be independently wired to ground. These substandard wiring techniques are mainly the result of ill-informed or careless installers.

In this situation, under normal wiring conditions, a hazardous condition is not the result. The ground and neutral conductor carries the flow of electricity back to the breaker or fuse box, where it is most likely properly grounded. Although grounding the receptacle directly from the third prong is preferred, this wiring condition is relatively safe. The hazardous condition occurs when the hot and neutral conductors are switched by mistake and the ground is shunted to the hot conductor. This causes the housing of any appliance or other fixture connected to this miswired receptacle to be energized. Inadvertent contact with the energized housing and a ground will cause an electric shock to the person creating this external circuit. For example, if an electric drill were plugged into the miswired receptacle, it would appear to operate normally, however, if the user touched both the external housing of the drill and a ground, such as a water pipe or a puddle on the floor, the electric current would flow through the drill and the user to ground, causing an electrocution. Because the circuit is completed between the hot and neutral conductors and no current is detected between the neutral and ground conductors, the ground fault interrupters and related testers cannot detect this condition and therefore report a normal condition.

What is lacking in the art, therefore, is a device which protects against the electrocution hazard caused by an electrical outlet having an electrically energized neutral blade receptacle which is shunted or otherwise electrically connected to the ground blade receptacle. Ground fault interrupter devices do not provide protection against this condition because they operate by looking for an imbalance in the current flows between the hot and neutral wires and do not monitor the ground wire. U.S. Pat. No. 5,754,114 to Gnadt issued May 19, 1998, U.S. Pat. No. 5,606,480, to Nevo, issued Feb. 5, 1997, and U.S. Pat. No. 4,843,514, to Bodkin issued Jun. 27, 1989, all of which are incorporated herein by reference, disclose devices that break the connections in the hot and neutral lines to the appliance or lamp when a miswiring condition is detected. However, such devices do not protect against the housing of the appliance or lamp becoming an electrocution hazard when the appliance or lamp is connected to an electrical outlet having an electrically energized ground blade receptacle. U.S. Pat. No. 6,023,400 to Nevo, issued Feb. 8, 2000, which is incorporated herein by reference, discloses a device that employs a virtual ground. Although this device provides protection against an electrical outlet having an electrically hot ground wire receptacle, it does so at the cost of totally eliminating any electrical connection between the ground line of the electrical outlet and that of the appliance or lamp, even when the electrical outlet is properly wired.

Howell, et al., U.S. Pat. No. 7,091,872, issued Aug. 15, 2006, recognizes this problem and attempts to rectify the problem by utilizing the impedance of the users body to earth ground as a voltage reference. It provides a "test surface" which the user must touch to determine the presence of the miswiring condition. It is not adapted to detect the condition in situ, that is, without any particular activity or procedure being conducted by the user, but directly upon connection of an equipped device or tester into the miswired receptacle.

Thus, there is a need for an inline device and/or passive tester that automatically provides protection against the electrocution hazard that is caused by a miswired electrical source in which the neutral conductor is electrically energized and shunted to the ground receptacle without any action or activity on the part of the user.

SUMMARY OF THE INVENTION

The present invention provides a device that protects against the electrocution hazard that is caused by a ground blade receptacle of an electrical outlet being electrically energized in addition to the hazard caused by the exchange of the hot and neutral conductors with a ground wire shunted to the hot conductor. Some embodiments of the invention also provide protection against the electrocution hazards that are caused by not connecting a proper ground wire to the ground blade receptacle of an electrical outlet, that is, where the ground blade receptacle is electrically open. Some embodiments of the present invention also protect against the electrocution hazards that are caused by the switching of the hot and neutral wires in an electrical outlet. More generally, the present invention protects a person who comes into contact with an electrical appliance or lamp from electrocution hazards that are incident to miswiring the electrical source to which the appliance or lamp is electrically connected, especially where that miswiring results in the putative ground wire of the electrical source being electrically charged.

Some embodiments of the present invention take the form of a device that is incorporated into an electrical outlet. Other embodiments take the form of an interface that plugs into an electrical outlet and which receives the plug of an appliance or lamp. Still other embodiments take the form of a device that is incorporated into the plug or into the power cord of an appliance or lamp. Other embodiments take the form of a device that is incorporated integrally into an appliance or lamp. Lastly, a hand held tester is disclosed which allows for independent detection of the miswiring conditions prior to the installation of an appliance or device into the miswired outlet.

In addition to providing protection against electrocution, some embodiments include a wiring condition indicator, for example, indicator lights or other displays or information outputs that provide information on the wiring condition of the electrical source that is to electrically supply the appliance or lamp.

Some embodiments of the present invention also provides methods of protecting an individual using or contacting an electrical appliance or lamp from an electrocution hazard that is caused by a miswiring condition of the electrical source which is to electrically supply the appliance or lamp. Of particular concern are miswiring conditions which result in the ground blade receptacle of the electrical outlet into which the appliance or lamp is plugged being electrically energized or not being properly connected. It is to be specifically noted that the features of each embodiment are interchangeable and additive, in that appliances and detectors may be adapted to incorporate all or any combination of the features.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

FIG. 1A illustrates an embodiment wherein the protection device is incorporated into the plug of an appliance.

FIG. 1B illustrates an embodiment wherein the protection device is incorporated into the power cord of an appliance.

FIG. 1C illustrates an embodiment wherein the protection device is incorporated into an appliance and the power cord of the appliance is plugged into an electrical outlet.

FIG. 1D illustrates an embodiment wherein the protection device is integrally incorporated into an appliance and the power cord is directly connected to the power supply line.

FIG. 1E illustrates an embodiment wherein the protection device is integrally incorporated into an appliance and the power supply line is connected directly to the appliance.

FIG. 1F illustrates an embodiment wherein the protection device is an independent interface that plugs into an electrical outlet and into which the plug of an appliance is plugged.

FIG. 1G illustrates an embodiment wherein the protection device is incorporated into an electrical outlet.

DETAILED DESCRIPTION OF PREFERRED EMBODIMENTS

In this section, some presently preferred embodiments of the present invention are described in detail sufficient for one skilled in the art to practice the present invention.

It is to be understood that in this section and in the appended claims, the term appliance is used in a broad sense to mean all electrically powered devices that are supplied with single-phase AC power and encompasses all electrical loads, including electric lamps. Furthermore, although the primary concern of the inventors is to provide electrocution protection from miswired electrical outlets, they also contemplate embodiments of the present invention which have utility where the appliance is wired directly into an electrical supply system rather than being plugged into an electrical outlet.

Figure 1A:
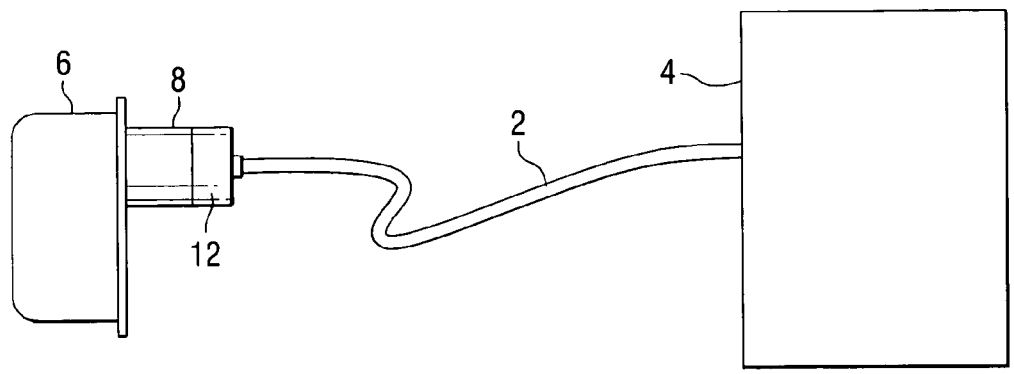
FIGS. 1A-1G are schematic drawings illustrating the placement of a protection device according to various presently preferred embodiments of the present invention.
Figure 1B:
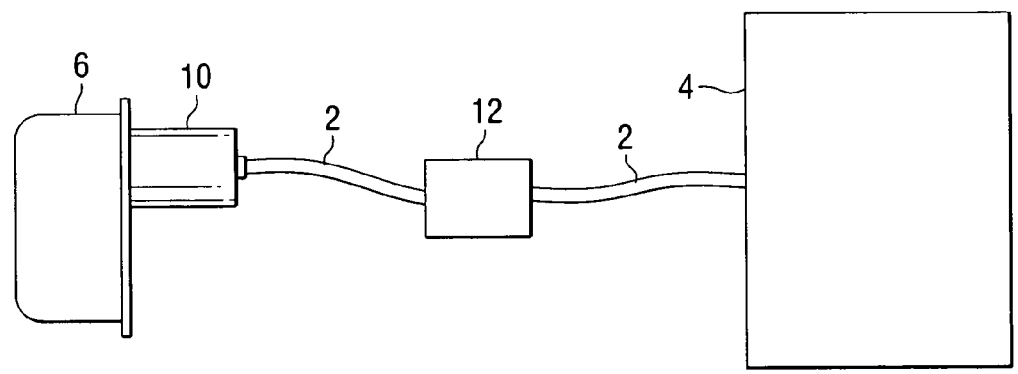
Figure 1C:
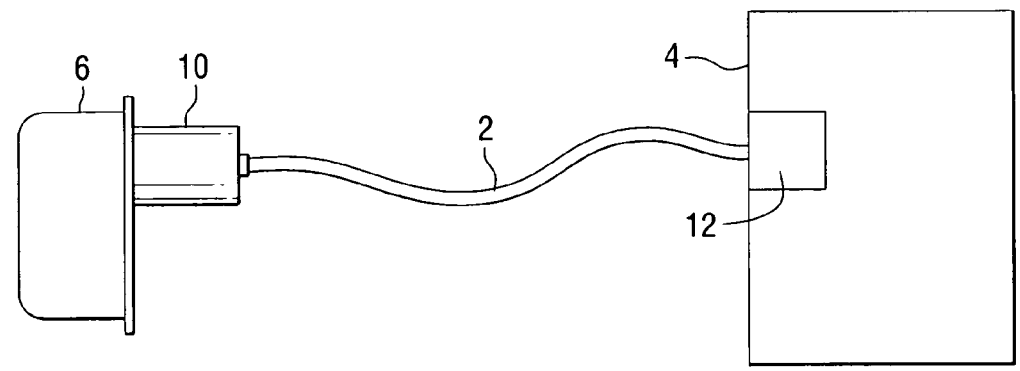
Figure 1D:
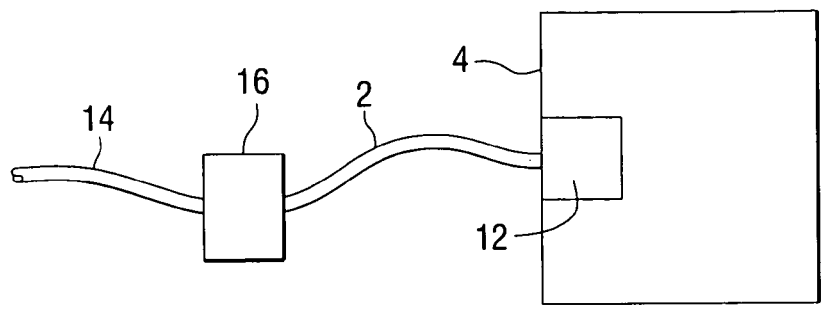
Figure 1E:
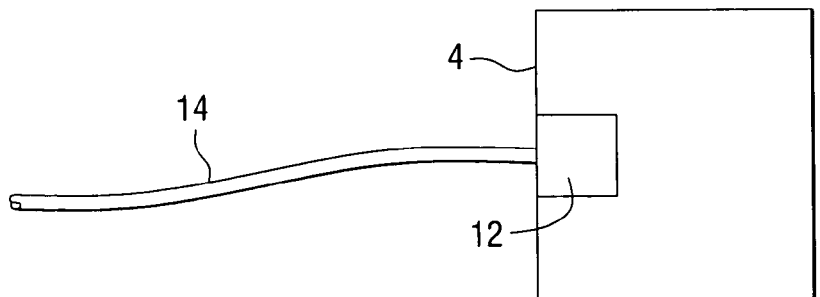

FIGS. 1A-1G schematically illustrate seven basic configurations of embodiments of the present invention. In the first five configurations, the protection device is associated with a particular appliance. Thus, the protection device provides electrocution protection to the user of the appliance no matter what electrical outlet the appliance is plugged into or what power source the appliance is otherwise electrically connected to. Such configurations are particularly preferred when the appliance is portable. Referring to FIG. 1A, the power cord 2 of appliance 4 is plugged into electrical outlet 6 by way of protector plug 8. Protector plug 8 incorporates a protection device 12. Referring to FIG. 1B, the power cord 2 of appliance 4 is plugged into electrical outlet 6 by way of a regular plug 10. In this configuration, a protection device 12 is incorporated into the power cord 2 at some convenient point along the power cord 2. Referring to FIG. 1C, the power cord 2 of appliance 4 is plugged into electrical outlet 6 by way of regular plug 10. In this configuration, a protection device 12 is incorporated into the appliance 4. Referring to FIG. 1D, the protection device again is incorporated directly into the appliance 4. However, instead of being plugged into an electrical outlet, the power cord 2 of the appliance 4 is connected directly to a power source line 14 in a work or connection box 16. Alternatively, referring to FIG. 1E, the power cord 2 may be omitted and the supply line 14 connected directly to the appliance 4 which incorporates a protection device 12.

Figure 1F:
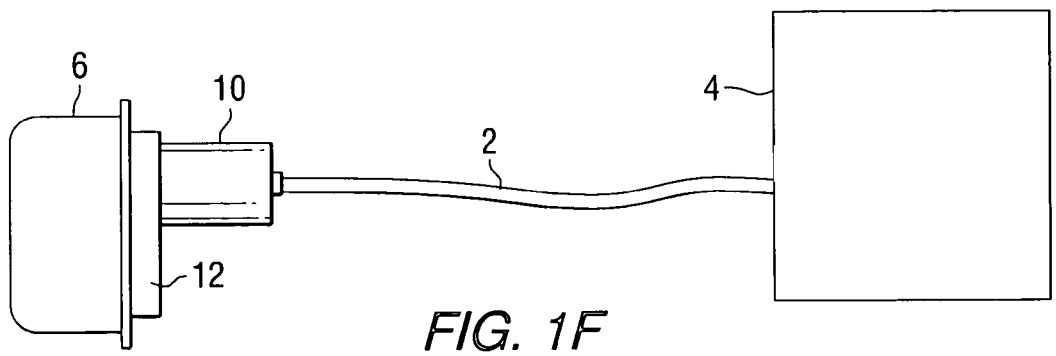
Figure 1G:
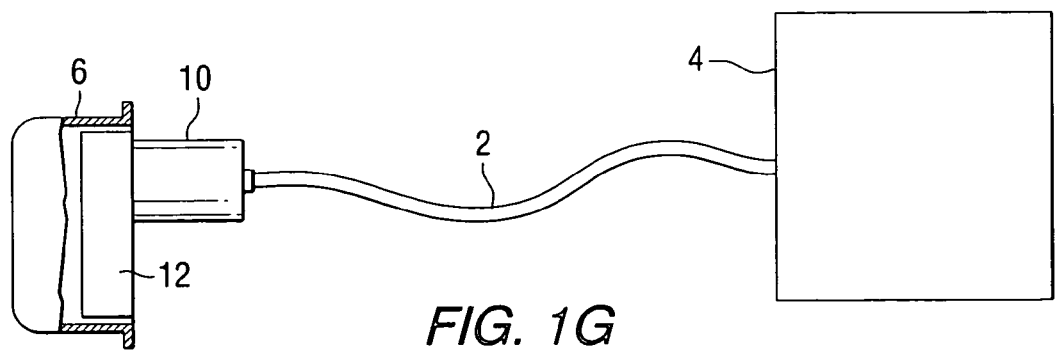

In the next two configurations, the protection device 12 is not associated with a particular appliance 4. Referring to FIG. 1F, the power cord 2 of appliance 4 is plugged into an independent, free-standing protection device 12 by way of regular plug 10. Protection device 12 is, in turn, plugged into electrical outlet 6. In this configuration, protection device 12 is a portable interface which may be plugged into any electrical outlet to provide electrocution protection with regard to any appliance or appliances that are powered by that electrical outlet. In contrast, referring to FIG. 1G, the protection device 12 in this configuration is incorporated into electrical outlet 6 to provide electrocution protection with regard to any appliance or appliances, for example, appliance 4, which are plugged into that particular electrical outlet 6.

Figure 2:
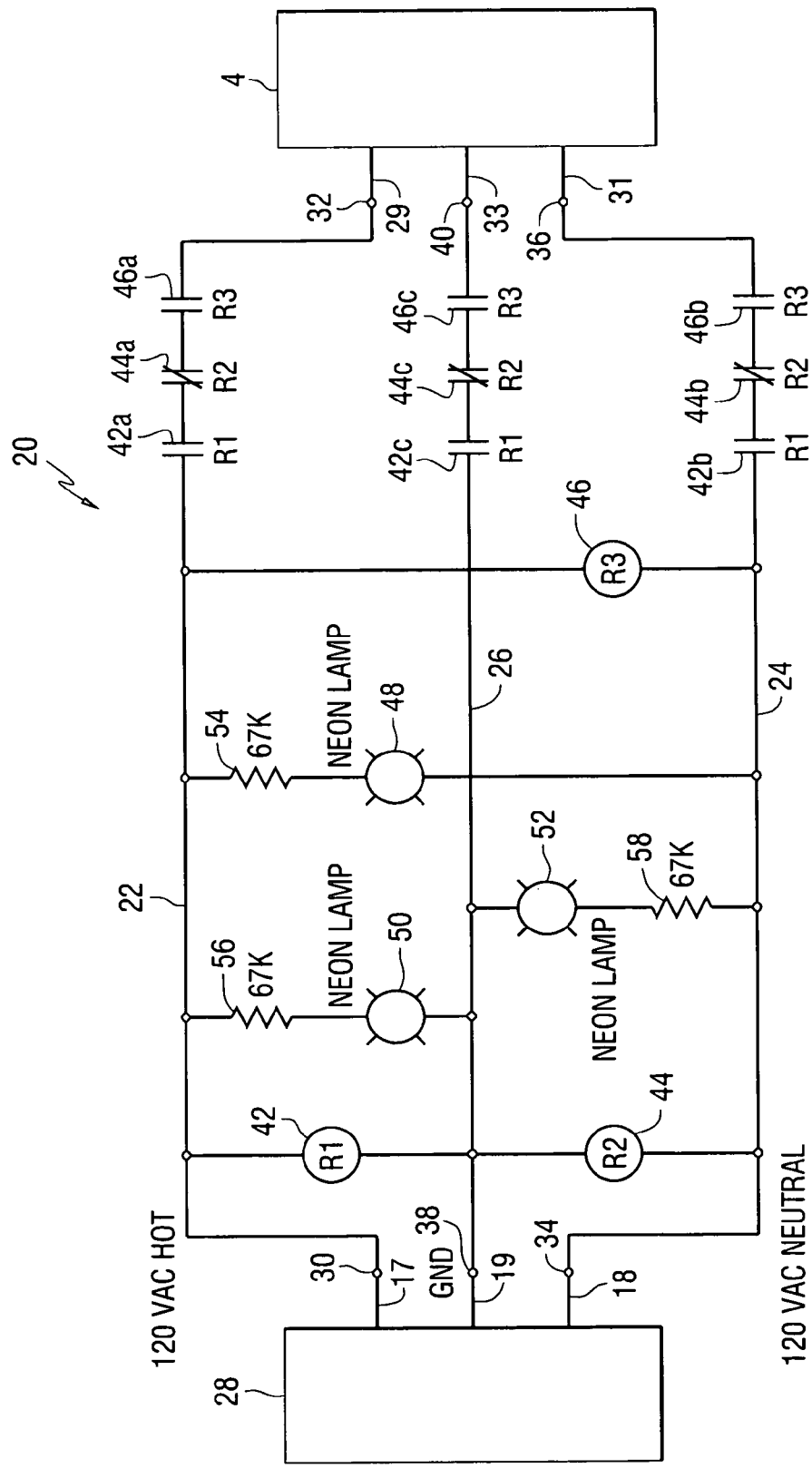
FIG. 2 is an electrical schematic diagram depicting the electrical circuit of a first embodiment.

Referring to FIG. 2, a first electrical circuit 20 of a protection device 12 according to an embodiment of the present invention is schematically illustrated. In some configurations, a separate casing is supplied to contain electrical circuit 20, for example, in the configurations illustrated in FIGS. 1B and 1F. In other configurations, electrical circuit 20 is adapted to be an integral part of another device or component, for example, of an appliance 4, as in FIGS. 1C-1E, of a protector plug 8, as in FIG. 1A, or of an electrical outlet, as in FIG. 1G. The provisions of such casings and the making of such incorporations are within the abilities of those skilled in the art and so are not further described herein.

In operation, protection device 12 is interposed into the electrical path between an electrical source 28 and an appliance 4. Protection device 12 is designed to provide electrical continuity between the electrical source 28 and the appliance 4 if electrical source 28 is correctly wired and to preclude such electrical continuity if electrical source 28 is miswired. Thus, except for the indicator lamps and their respective resistors and connectors, the components of electrical circuit 20 are selected to be of sufficient gauge and conductivity to at least carry the electrical load of the appliance 4 with which the protection device 12 is to be used. In some embodiments, for example, in those embodiments in which the protection device 12 is not associated with a particular appliance 4, the components of the electrical circuit 20 are preferably selected to be safely used with an electrical load magnitude which corresponds to a conventional circuit breaker or fuse amperage level, for example 15 amps or 20 amps, and the protection device 12 may be marked to indicate that amperage level rating so as to indicate that the protection device 12 should be used in a circuit that is load-protected to that amperage level.

The protection device 12 is also sometimes referred to herein as an electrical continuity preclusion apparatus, because protection device 12 precludes electrical conductivity between one or more lines of the electrical source 28 and a corresponding line or lines of an appliance 4 when the protection device 12 detects a miswiring condition in the electrical source 28.

Electrical circuit 20 includes first, second, and third conductance lines 22, 24, 26 which correspond, respectively, to the putative hot, neutral, and ground wires or lines 29, 31, 33 of the appliance 4 and 17, 18, 19 of the electrical source 28. FIG. 2 is notated to reflect a correct wiring condition, although it is to be understood that these labels are being used here only as a conceptual convenience rather than to indicate the actual wiring condition of the electrical source 28. Nonetheless, it is to be understood that all references herein to the hot, neutral, or ground wires of the appliance 4 refer to the wires or lines that one skilled in the art would so designate based upon the design of the appliance 4.

Accordingly, first conductance line 22 has input end 30 that is to be electrically connected to what is expected from electrical wiring convention to be the hot wire of the electrical source 28, that is, to the putative hot wire 17 of the electrical source 28, and an output end 32 that is to be electrically connected to the hot wire 29 of the appliance 4. Second conductive line 24 has an input end or terminal 34 that is to be electrically connected to the putative neutral wire 18 of the electrical source 28 and an output end or terminal 36 that is to be electrically connected to the neutral wire 31 of the appliance 4. Third conductive line 26 has an input end or terminal 38 that is to be electrically connected to the putative ground wire 19 of the electrical source 28 and an output end or terminal 40 that is to be electrically connected to the ground wire 33 of the appliance 4.

Electrical circuit 20 also includes three three-pole double-throw relays, each of which includes a sensing coil and a set of three contact switches which are operated by the sensing coil. A first three-pole double-throw relay includes first sensing coil 42 and normally-open first contact switches 42a, 42b, 42c. First sensing coil 42 is electrically connected across first conductive line 22 and third conductive line 26. First contact switches 42a, 42b, 42c are located, respectively, within first, second, and third conductive lines 22, 24, and 26. In their normally-open condition, first contact switches 42a, 42b, 42c break the electrical continuity of, respectively, first, second, and third conductive lines 22, 24, 26.

A second three-pole double-throw relay includes second sensing coil 44 and normally-closed contact switches 44a, 44b, 44c. Second sensing coil 44 is electrically connected across second conductive line 24 and third conductive line 26. Second contact switches 44a, 44b, 44c, are located, respectively, within first, second, and third conductive lines 22, 24, 26. When normally-closed second contact switches 44a, 44b, 44c are opened by second sensing coil 44 becoming energized by a voltage difference between second and third conductive lines 24, 26, they break the electrical continuity of, respectively, first, second, and third conductive lines 22, 24, 26.

A third three-pole double-throw relay includes third sensing coil 46 and normally-open contact switches 46a, 46b, 46c. Third sensing coil 46 is electrically connected across first conductive line 22 and second conductive line 24. Third contact switches 46a, 46b, 46c are located, respectively, within first, second, and third conductive lines 22, 24, 26. In their normally-open condition, third contact switches 46a, 46b, 46c break the electrical continuity of, respectively, first, second, and third conductive lines 22, 24, 26.

Electrical circuit 20 also includes three indicator lights, first, second, and third indicator lights 48, 50, 52 and their associated resistors, respectively, first, second, and third resistors 54, 56, 58. These indicator lights provide a visual indication of whether or not electrical source 28 is correctly wired.

First, second and third indicator lights 48, 50, 52 and their associated resistors 54, 56, 58 are to be selected to be compatible with the nominal voltage of electrical source 28. For example, where electrical source 28 is nominally 120 VAC, each of first, second and third lights 48, 50, 52 may be a 60 V neon lamps and each of first, second and third resistors 54, 56, 58 may be a 67 K, 0.25 watt resistor. The lamps may be used with colored lenses. It is preferred that first and second lamps 49, 50 be used with amber lenses and third lamp 52 be used with a red lens.

First indicator light 48 and first resistor 54 are electrically connected in series between first and second conductive lines 22, 24 so that first indicator light 48 glows if there is a voltage difference between these two conductive lines. Second indicator light 50 and second resistor 56 are electrically connected in series between first and third conducive lines 22, 26 so that second indicator light 50 glows if there is a voltage difference between these two conductive lines. If electrical source 28 is correctly wired, both of these lights will glow. Third indicator light 52 and third resistor 58 are electrically connected in series between second and third conductive lines 24, 26 so that third indicator light 52 glows if there is a voltage difference between these two conductive lines. If the electrical source 28 is correctly wired, third indicator light 52 will not glow because second and third conductive lines 24, 26 will be connected, respectively, to the putative neutral and ground lines 18, 19 of electrical source 28 which are nominally at the same voltage potential. Third indicator light 52 will only glow if electrical source 28 is miswired so that one second and third conductive lines 24, 26 becomes electrically energized with respect to the other.

During the operation of the protection device 12, any of the first, second, and third sensing coils 42, 44, 46 will become energized when a voltage difference exists between the conductive lines to which the particular sensing coil is connected across. Upon being energized, each of first, second, or third sensing coil 42, 44, 46 causes its associated contact switches to reverse position so that normally-open contact switches will close and normally-closed contact switches will open.

For example, if the electrical source 28 is correctly wired, first sensing coil 42 will be energized by the voltage difference between the first conductive line 22 and the third conductive line 26 caused by the voltage difference between the putative hot and ground wires 17, 19 of the electrical source 28. This causes normally-open first contact switches 42a, 42b, 42c to close. Likewise, third sensing coil 46 will be energized by the voltage difference between the first conductive line 22 and the second conductive line 24 caused by the voltage difference between the putative hot and neutral wires 17, 18 of the electrical source 28. This causes normally-open third contact switches 46a, 46b, 46c to close. However, second sensing coil 44 does not become energized because there is no voltage difference between the second and third conductive lines 24, 26 since there is no voltage difference between the putative neutral and the putative ground wires 18, 19 of the electrical source 28, and so normally-closed second contact switches 44a, 44b, 44c remain closed. Thus, when electrical source 28 is correctly wired, all three switches 42a, 44a, 46a are closed in conductive line 22, thereby providing electrical continuity between the putative hot wire 17 of the electrical source 28 and the hot wire 29 of the appliance 4; all three switches 42b, 44b, 46b are closed in conductive line 24, thereby providing electrical continuity between the putative neutral wire 18 of the electrical source 28 and the neutral wire 31 of appliance 4; and all three switches 42c, 44c, 46c are closed in conductive line 26, thereby providing electrical continuity between the putative ground wire 19 of the electrical source 28 and the ground wire 33 of the appliance 4.

However, if the electrical source 28 is miswired, one or more of first, second or third sensing coils 42, 44, 46 may detect a miswiring condition and cause its associated contact switches to preclude electrical continuity between the electrical source 28 and the appliance 4 through first, second, or third conductive lines 22, 24, 26. Table 1 illustrates the various conditions that can exist at the first, second, and third input terminals 30, 34, and 38 of electrical circuit 20 that can exist due to the correct or miswiring of electrical source 28, the resulting open or closed condition of the switches 42a-c, 44a-c, 46a-c and whether the electrical continuity through first, second, and third conductive lines 22, 24, 26 to the first, second, and third output terminals 32, 36, 40 is continuous or broken.

TABLE 1

| Condition Number | First input terminal 30* | Second input terminal 34* | Third input terminal 38* | First contact switches 42a-c | Second contact switches 44a-c | Third contact switches 46a-c | Continuity to first output terminal 32 | Continuity to second output terminal 36 | Continuity to third output terminal 40 |
|---|---|---|---|---|---|---|---|---|---|
| 1 | hot | neutral | ground | closed | closed | closed | continuous | continuous | continuous |
| 2 | hot | ground | neutral | closed | closed | closed | continuous | continuous | continuous |
| 3 | neutral | hot | ground | open | open | closed | broken | broken | broken |
| 4 | neutral | ground | hot | closed | open | closed | broken | broken | broken |
| 5 | ground | neutral | hot | closed | open | closed | broken | broken | broken |
| 6 | ground | hot | neutral | open | open | closed | broken | broken | broken |
| 7 | open | neutral | ground | open | closed | open | broken | broken | broken |
| 8 | open | ground | neutral | open | closed | open | broken | broken | broken |
| 9 | open | neutral | hot | open | open | open | broken | broken | broken |
| 10 | open | hot | neutral | open | open | open | broken | broken | broken |
| 11 | open | hot | ground | open | open | open | broken | broken | broken |
| 12 | open | ground | hot | open | open | open | broken | broken | broken |
| 13 | hot | open | ground | closed | closed | open | broken | broken | broken |
| 14 | ground | open | hot | closed | closed | open | broken | broken | broken |
| 15 | neutral | open | ground | open | closed | open | broken | broken | broken |
| 16 | ground | open | neutral | open | closed | open | broken | broken | broken |
| 17 | hot | open | neutral | closed | closed | open | broken | broken | broken |
| 18 | neutral | open | hot | closed | closed | open | broken | broken | broken |
| 19 | hot | neutral | open | open | closed | closed | broken | broken | broken |
| 20 | neutral | hot | open | open | closed | closed | broken | broken | broken |
| 21 | hot | ground | open | open | closed | closed | broken | broken | broken |
| 22 | ground | hot | open | open | closed | closed | broken | broken | broken |
| 23 | neutral | ground | open | open | closed | open | broken | broken | broken |
| 24 | ground | neutral | open | open | closed | open | broken | broken | broken |
| 25 | hot | open | open | open | closed | open | broken | broken | broken |
| 26 | open | hot | open | open | closed | open | broken | broken | broken |
| 27 | open | open | hot | open | closed | open | broken | broken | broken |
| 28 | open | neutral | open | open | closed | open | broken | broken | broken |
| 29 | open | open | neutral | open | closed | open | broken | broken | broken |
| 30 | neutral | open | open | open | closed | open | broken | broken | broken |
| 31 | open | open | ground | open | closed | open | broken | broken | broken |
| 32 | ground | open | open | open | closed | open | broken | broken | broken |
| 33 | open | ground | open | open | closed | open | broken | broken | broken |
| 34 | open | open | open | open | closed | open | broken | broken | broken |

*In the columns relating to the input terminals, the term "open" indicates that there is no electrical supply to this terminal. This can occur where the supply line has been omitted or has been left unconnected or there is a break in continuity in the line supplying the terminal. In the columns relating to the switches, the term "open" refers to the position state of the switch.

Condition 1 in Table 1 shows that the electrical circuit 20 allows electrical current to flow through the protection device 12 when the electrical source 28 is properly wired. Table 1 also shows that the electrical circuit 20 permits electrical flow-through in condition 2 where the putative neutral and ground wires 18, 19 of electrical source 28 have been reversed or swapped. Although condition 2 is a miswiring condition, it does not present an electrocution hazard for an appliance 4 which has a ground wire 33 to its housing, because the appliance 4 is still grounded through output terminal 40, albeit through a neutral line, that is putative neutral line 18, of the electrical source 28 instead of through a ground line, that is putative ground line 19, of the electrical source 28. In all other miswirings conditions of the electrical source 28, including those that present electrocution hazards, the electrical circuit 20 precludes any electrical connection of the appliance 4 to the electrical source 28 under the conditions shown. Thus, a protection device 12 incorporating first electrical circuit 20 protects against electrocution hazards resulting from swapped hot and ground wires in electrical source 28 as well as from swapped hot and neutral wires in electrical source 28.

Table 1 also shows that a protection device 12 incorporating electrical circuit 20 provides electrocution hazard protection where the ground wire from the electrical source 28 has been omitted or left unconnected, that is, where the putative ground wire 19 of the electrical source 28 is in the electrically open condition. For example, in condition 19, first sensor coil 42 senses that the putative ground wire 19 of the electrical source 28 is electrically open and causes normally open first contact switch 42a to remain open, thus precluding electrical continuity between the putative hot wire 19 of the electrical source 28 and the hot wire 33 of the appliance 4.

One skilled in the art will recognize an advantage in the second contact switches 44a-c being normally closed switches. The advantage is that all electrical conductivity from the electrical source 28 to the appliance 4 is precluded when one or the other of the putative ground wire 19 or the putative neutral wire 18 of the electrical source 28 is electrically energized.

Figure 3:
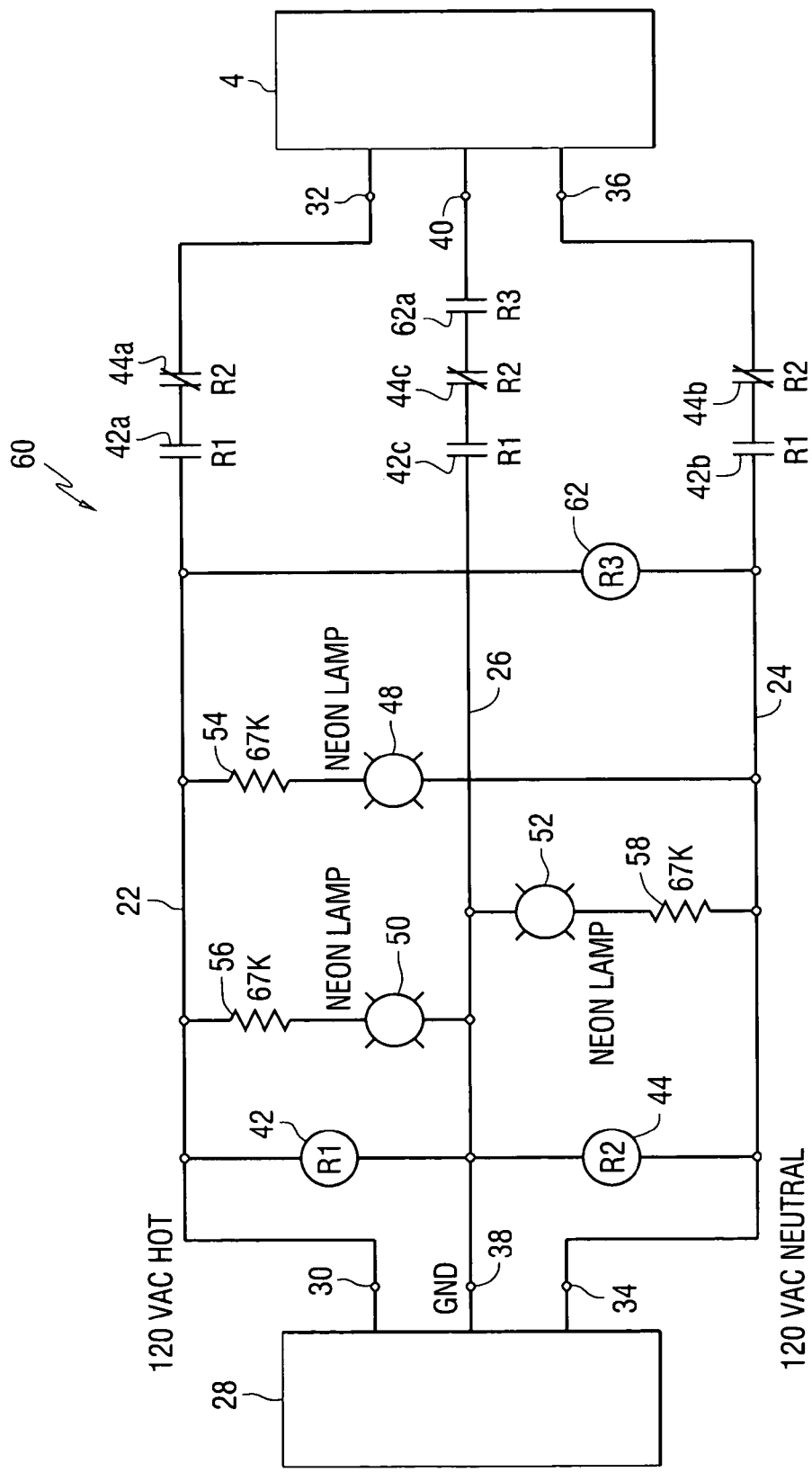
FIG. 3 is an electrical schematic diagram depicting the electrical circuit of a second embodiment.

It is to be understood that there are some electrocution hazards incident to miswiring of the electrical source 28 that may not be protected against by a particular embodiment. Consider, for example, an embodiment shown in FIG. 3 which employs second electrical circuit 60. Second electrical circuit 60 is the same as first electrical circuit 20, except that the three-pole, double-throw relay that comprises third sensing coil 46 and its associated contact switches 46a-c in first electrical circuit 20 has been replaced in second electrical circuit 60 with a single-pole relay having only one normally-open contact switch 62a associated with its sensing coil 62. That contact switch 62a is located in conductive line 26. Table 2 illustrates, in a manner similar to that of Table 1, the effect that various wiring configurations of electrical source 28 have on second electrical circuit 60.

TABLE 2

| Condition Number | First input terminal 30* | Second input terminal 34* | Third input terminal 38* | First contact switches 42a-c | Second contact switches 44a-c | Third contact switch 62a | Continuity to first output terminal 32 | Continuity to second output terminal 36 | Continuity to third output terminal 40 |
|---|---|---|---|---|---|---|---|---|---|
| 1 | hot | neutral | ground | closed | closed | closed | continuous | continuous | continuous |
| 2 | hot | ground | neutral | closed | closed | closed | continuous | continuous | continuous |
| 3 | neutral | hot | ground | open | open | closed | broken | broken | broken |
| 4 | neutral | ground | hot | closed | open | open | broken | broken | broken |
| 5 | ground | neutral | hot | closed | open | open | broken | broken | broken |
| 6 | ground | hot | neutral | open | open | closed | broken | broken | broken |
| 7 | open* | neutral | ground | open | closed | open | broken | broken | broken |
| 8 | open | ground | neutral | open | closed | open | broken | broken | broken |
| 9 | open | neutral | hot | open | open | open | broken | broken | broken |
| 10 | open | hot | neutral | open | open | open | broken | broken | broken |
| 11 | open | hot | ground | open | open | open | broken | broken | broken |
| 12 | open | ground | hot | open | open | open | broken | broken | broken |
| 13 | hot | open | ground | closed | closed | open | continuous | continuous | broken |
| 14 | ground | open | hot | closed | closed | open | continuous | continuous | broken |
| 15 | neutral | open | ground | open | closed | open | broken | broken | broken |
| 16 | ground | open | neutral | open | closed | open | broken | broken | broken |
| 17 | hot | open | neutral | closed | closed | open | continuous | continuous | broken |
| 18 | neutral | open | hot | closed | closed | open | continuous | continuous | broken |
| 19 | hot | neutral | open | open | closed | closed | broken | broken | broken |
| 20 | neutral | hot | open | open | closed | closed | broken | broken | broken |
| 21 | hot | ground | open | open | closed | closed | broken | broken | broken |
| 22 | ground | hot | open | open | closed | closed | broken | broken | broken |
| 23 | neutral | ground | open | open | closed | open | broken | broken | broken |
| 24 | ground | neutral | open | open | closed | open | broken | broken | broken |
| 25 | hot | open | open | open | closed | open | broken | broken | broken |
| 26 | open | hot | open | open | closed | open | broken | broken | broken |
| 27 | open | open | hot | open | closed | open | broken | broken | broken |
| 28 | open | neutral | open | open | closed | open | broken | broken | broken |
| 29 | open | open | neutral | open | closed | open | broken | broken | broken |
| 30 | neutral | open | open | open | closed | open | broken | broken | broken |
| 31 | open | open | ground | open | closed | open | broken | broken | broken |
| 32 | ground | open | open | open | closed | open | broken | broken | broken |
| 33 | open | ground | open | open | closed | open | broken | broken | broken |
| 34 | open | open | open | open | closed | open | broken | broken | broken |

*In the columns relating to the input terminals, the term "open" indicates that there is no electrical supply to this terminal. This can occur where the supply line has been omitted or has been left unconnected or there is a break in continuity in the line supplying the terminal. In the columns relating to the switches, the term "open" refers to the position state of the switch.

Table 2 shows that appliance 4 remains unprotected against electrocution hazards incident to conditions numbers 13 and 17. In each of these conditions, the putative neutral wire 18 of the electrical source 28 is open and the putative hot wire 17 of the electrical source 28 is electrically energized. Under these conditions, the output terminal 32 of the first conductive line 22 is also electrically energized while the electrical continuity between the putative ground wire 19 of the electrical source 28 and the ground wire 33 of the appliance 4 through third conductive line 26 is broken, causing the appliance 4 to be ungrounded. In these circumstances, an electrical short to the housing of the appliance 4 would present electrocution hazard to anyone who comes into simultaneous contact with the housing and an electrical ground. Although embodiments that leave one or more potential electrocution hazards unprotected against are not preferred, second electrical circuit 60 is described herein as an aid to understanding that the scope of the claims appended hereto is not limited to embodiments which provide protection against all possible electrocution hazards.

Although first and second electrical circuits 20, 60 include indicator lights, that is, first, second, and third indicator lights 48, 50, 52 and associated resistors, that is, first, second, and third resistors 54, 56, 58, it is to be understood that such indicators or other kinds of indicators, for example, voltmeter displays, computer interfaces, et cetera, which provide an indication of the wiring correctness of the electrical source 28 are among components included in some, but not all, embodiments of the present invention.

Figure 4:
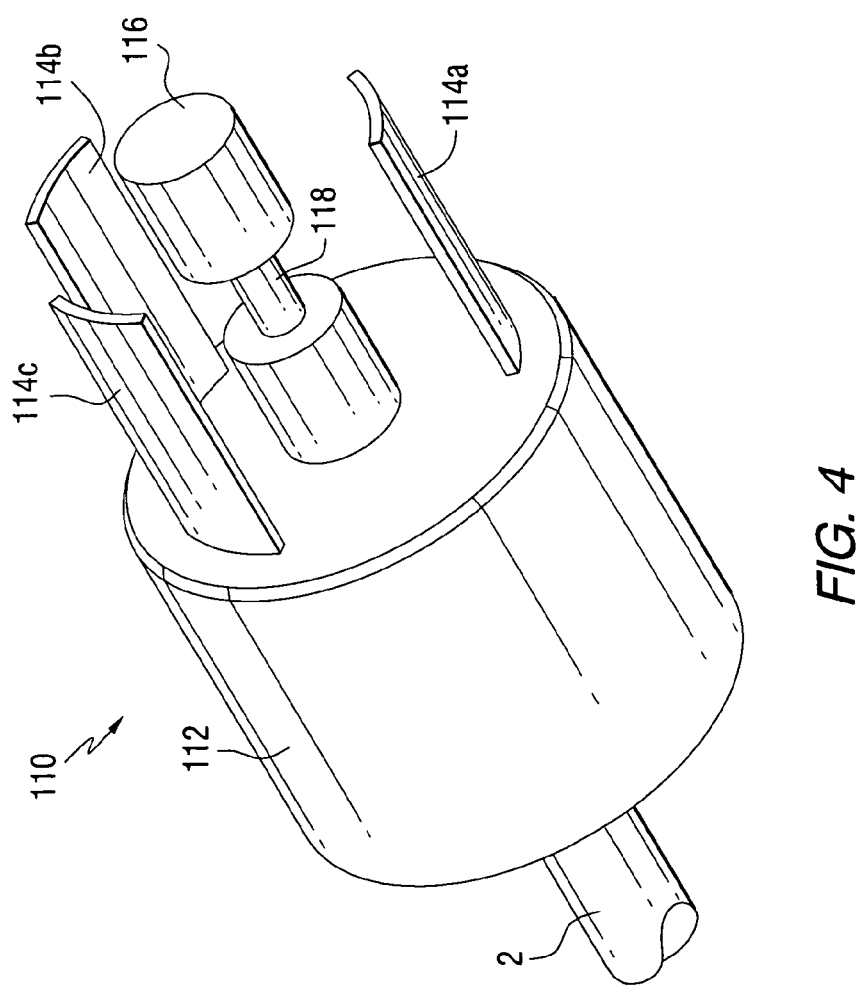
FIG. 4 illustrates the plug section of a second embodiment wherein the protection device is an independent interface that plugs into an electrical outlet and into which the proprietary plug of an appliance is plugged.
Figure 5:
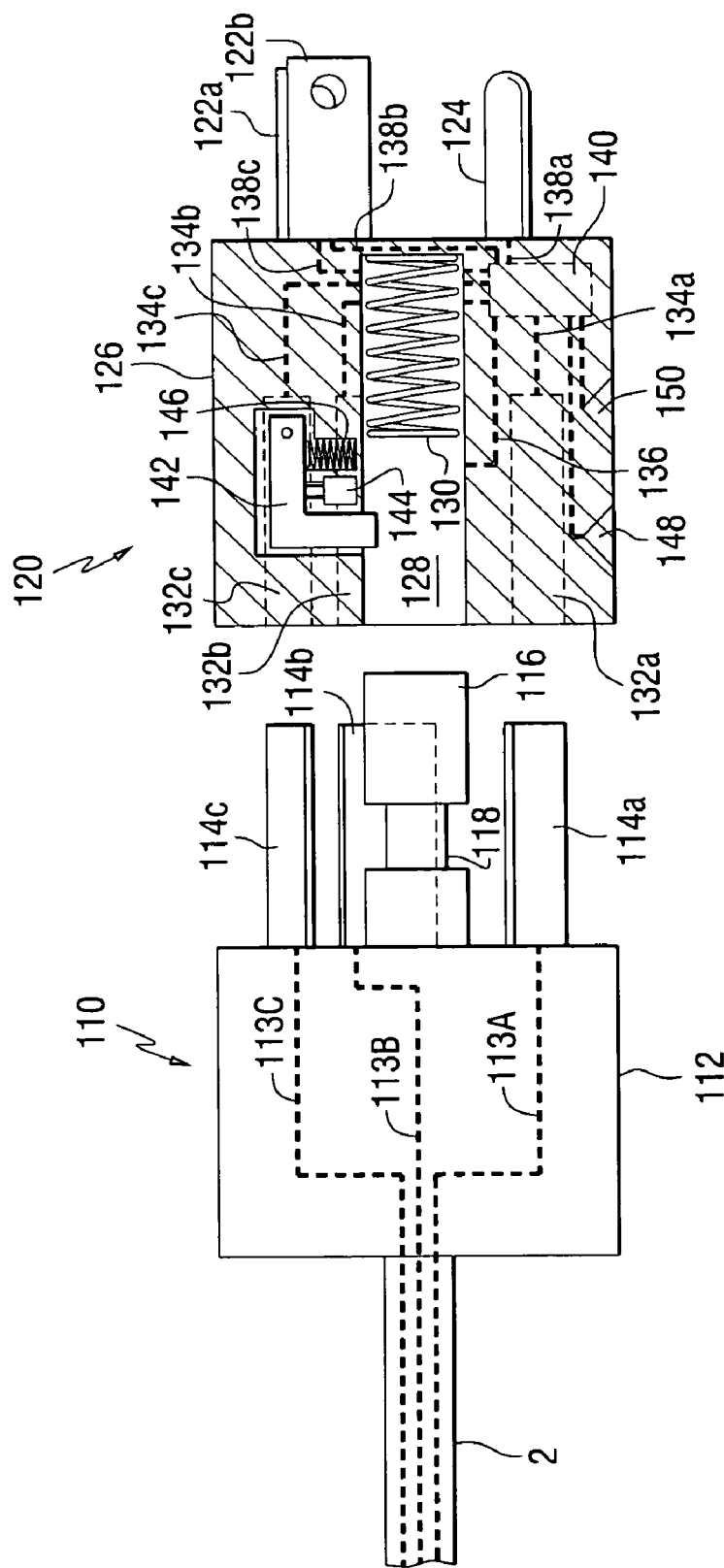
FIG. 5 is a side elevational view, partially in section, of the plug and interface of the embodiment illustrated in FIG. 4.

Referring now to FIGS. 4 and 5, a second embodiment is shown which houses the protective circuitry in an independent interface, which is intended to be mounted between the appliance plug and a conventional wall circuit.

Referring now to FIG. 4, the putative appliances provided with a proprietary plug 110 having a power cord 2, which is permanently affixed to said appliance. The proprietary plug 110 has a support housing 112 from which electrical contacts 114a, b and c protrude. Electrical contacts 114 are intended to carry the conventional, hot, neutral and ground circuits that are provided in an unconventional shape so that the plug may not be inserted into a conventional wall outlet without the associated interface as described herein. While arcuate electrical contacts 114 are illustrated, it is to be specifically noted that those skilled in the art may adapt any shape or configuration which prevents the insertion of the plug into a conventional wall outlet while maintaining an appropriate electrical contact with the interface. Additionally, the electrical contacts may be independently sized or shaped to require the insertion of support housing 112 in a particular orientation within interface 120. One such embodiment is shown with respect to electrical contact 114a, which is keyed in an L-shape. Support housing 112 is also provided with mount stud 116, which is intended to carry no electrical current. Mounting stud 116 is further provided with locking recess 118. While mounting stud 116 and locking recess 118 are shown as circular in section, it is to be specifically noted that those skilled in the art may substitute a locking stud and recess of any geometric shape appropriate for the application.

Referring now to FIG. 5, power cord 2 is illustrated having three electrical leads contained therein being 113a, 113b and 113c respectively, which are associated electrically and physically with electrical contacts 114a, b and c respectively and provide current thereto. Electrical interface 120 is illustrated as being mounted between proprietary plug 110 and the conventional wall outlet not shown. Interface 120 is provided with a conventional electrical outlet plug having electrical contacts 122a, 122b and 124 for the interconnection of the interface 120 to a conventional wall socket having hot and neutral blade type connectors 122a and 122b and cylindrical ground contact 124. The electrical contacts are permanently affixed within interface housing 126 which contains the protection device as herein described.

Interface housing 126 is further provided with a bore 128 disposed medially and actually as adapted to receive mounting shaft 116. Mounting spring 130 is located within bore 128 and is biased such that the insertion of mounting shaft 116 compresses spring 130 which is biased against such insertion and without external restraint, is provided with sufficient resiliency to eject mounting shaft 116 together with proprietary plug 110 from interface 120. Interface housing 126 is further provided with three electrical contact sockets 132a, b and c respectively, which are adapted to receive both physically and electrically, electrical contacts 114a, 114b and 114c respectively of proprietary plug 110. Electrical contact between sockets 132 and control circuit 140 are provided by interface contact connectors 134a, b, and c respectively, corresponding to sockets 132a, b and c. Electrical contact between control circuit 140 and the conventional plug elements 122 and 124 are provided by contact circuitry connectors 138a, b and c corresponding to the ground 124 and hot and neutral contacts 122a and b respectively.

Proprietary plug 110 is received and restrained by interface 120 through the use of a locking pawl 142, which is pivotally mounted within housing 126. Locking pawl 142 is biased against engagement with mounting shaft 116 and locking recess 118 by spring 146, such that absent an external force locking pawl 142 will not engage, receive or restrain mounting shaft 116 or locking recess 118. Locking pawl 142 and locking recess 118, however, are sized and shaped such that in an engagement position, locking pawl 142 will extend into bore 128 of housing 126 and engage the recessed surface of mounting shaft 116 at the shoulder section of locking recess 118 to the extent that locking pawl 142 remains in the engaged position. The force of spring 130 within bore 128 will urge locking pawl 142 against locking recess 118 and restrain proprietary plug 110 within housing 126 of interface 120.

Locking pawl 142 is converted from a locking or engagement position to an unlocked or unengaged position by relay 144. In the engaged or active mode relay 144 urges locking pawl 142 against spring 146 thereby compressing spring 146 and placing locking pawl 142 into a position such that locking pawl 142 extends into bore 128. In the neutral mode, however, relay 144 exerts no force against locking pawl 142, which is placed into an unengaged mode by the force of spring 146.

Referring to FIGS. 6A-6D, a second electrical circuit 20 of a protection device 12 according to an embodiment of the present invention is schematically illustrated, which is generally similar to that illustrated in FIG. 2. Electrical circuit 20 includes first, second, and third conductance lines 22, 24, 26 which correspond, respectively, to the putative hot, neutral, and ground wires or lines 17, 18, 19 of the appliance 4 (not shown) and of the electrical source 28 (not shown). FIGS. 6A-6D are notated to reflect a correct wiring condition, although it is to be understood that these labels are being used here only as a conceptual convenience rather than to indicate the actual wiring condition of the electrical source 28. Nonetheless, it is to be understood that all references herein to the hot, neutral, or ground wires of the appliance 4 refer to the wires or lines that one skilled in the art would so designate based upon the design of the appliance 4.

Accordingly, first conductance line 22 has input end 30 that is to be electrically connected to what is expected from electrical wiring convention to be the hot wire of the electrical source 28, that is, to the putative hot wire 17 of the electrical source 28, and an output end 32 that is to be electrically connected to the hot wire 29 of the appliance 4. Second conductive line 24 has an input end or terminal 34 that is to be electrically connected to the putative neutral wire 18 of the electrical source 28 and an output end or terminal 36 that is to be electrically connected to the neutral wire 31 of the appliance 4. Third conductive line 26 has an input end or terminal 38 that is to be electrically connected to the putative ground wire 19 of the electrical source 28 and an output end or terminal 40 that is to be electrically connected to the ground wire 33 of the appliance 4.

Figure 6A:
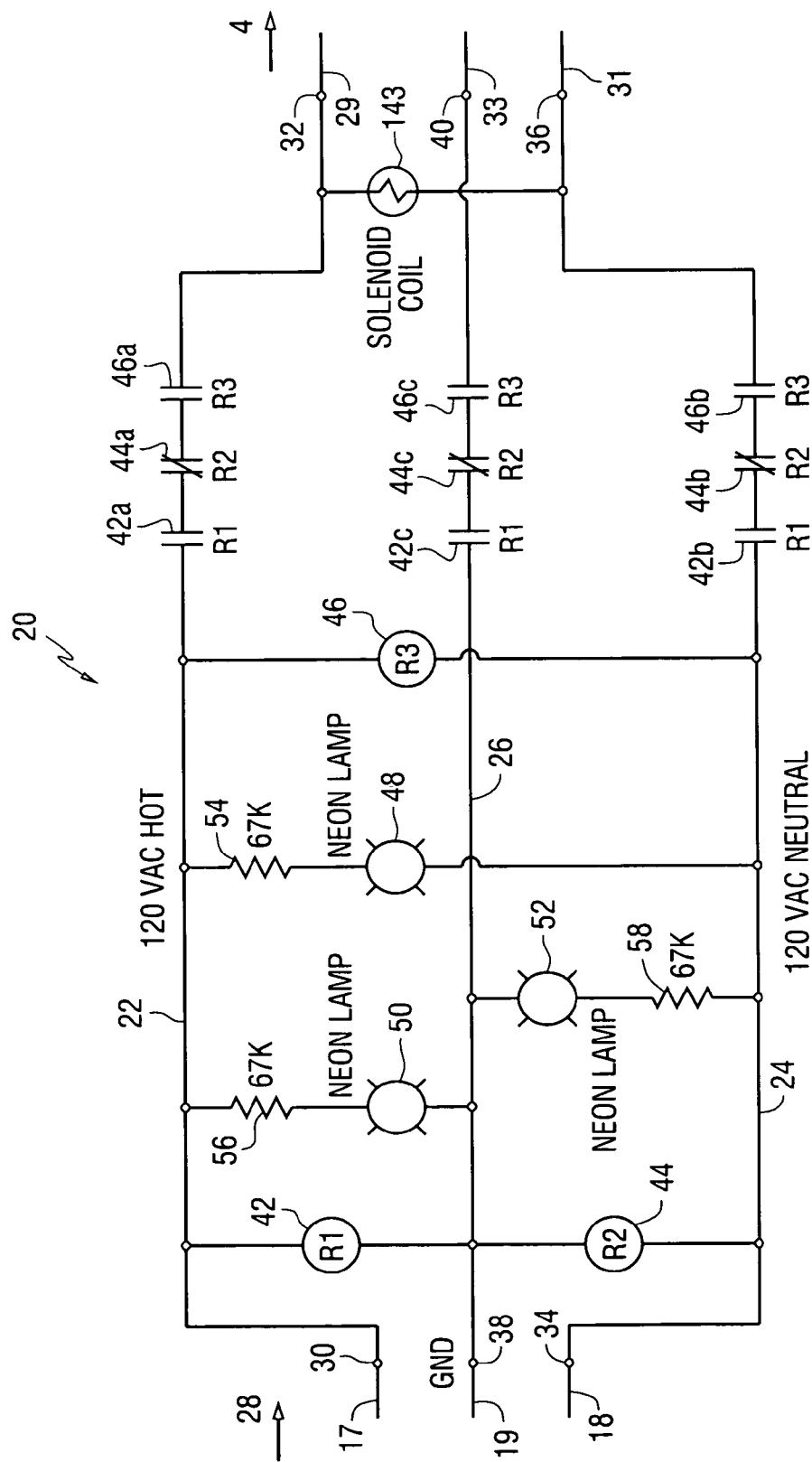
FIG. 6A is a schematic diagram of a first control circuit for the embodiment illustrated in FIGS. 4 and 5.

Electrical circuit 20, in the embodiment shown in FIG. 6A, also includes three three-pole double-throw relays, each of which includes a sensing coil and a set of three normally-open contact switches which are operated by the sensing coil. The embodiments illustrated in FIGS. 6B-6D, utilize only two sets of three-pole double-throw relays, eliminating 42a, 42b, 42c, such that putative ground or third conductive line 26 is never broken in operation. In all other aspects of operation, the embodiments in FIGS. 6A-6D are similar with respect to the relay operation. A first three-pole double-throw relay includes first sensing coil 42 and normally-open first contact switches 42a, 42b, 42c. First sensing coil 42 is electrically connected across first conductive line 22 and third conductive line 26. First contact switches 42a, 42b, 42c are located, respectively, within first, second, and third conductive lines 22, 24, and 26. In their normally-open condition, first contact switches 42a, 42b, 42c break the electrical continuity of, respectively, first, second, and third conductive lines 22, 24, 26.

A second three-pole double-throw relay includes second sensing coil 44 and normally-closed contact switches 44a, 44b, 44c. Second sensing coil 44 is electrically connected across second conductive line 24 and third conductive line 26. Second contact switches 44a, 44b, 44c, are located, respectively, within first, second, and third conductive lines 22, 24, 26. When normally-closed second contact switches 44a, 44b, 44c are opened by second sensing coil 44 becoming energized by a voltage difference between second and third conductive lines 24, 26, they break the electrical continuity of, respectively, first, second, and third conductive lines 22, 24, 26.

A third three-pole double-throw relay includes third sensing coil 46 and normally-open contact switches 46a, 46b, 46c. Third sensing coil 46 is electrically connected across first conductive line 22 and second conductive line 24. Third contact switches 46a, 46b, 46c are located, respectively, within first, second, and third conductive lines 22, 24, 26. In their normally-open condition, third contact switches 46a, 46b, 46c break the electrical continuity of, respectively, first, second, and third conductive lines 22, 24, 26.

Figure 6B:
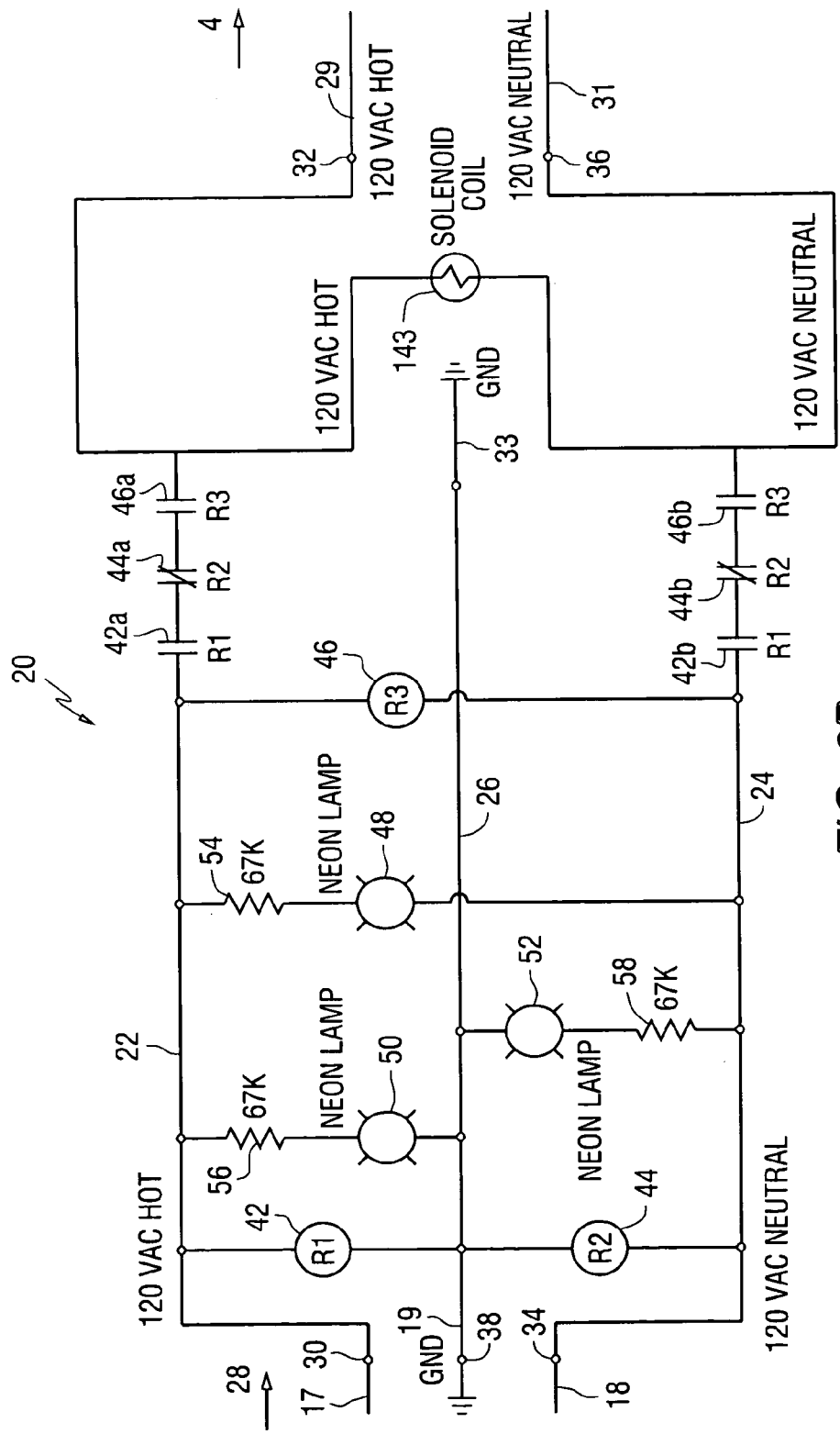
FIG. 6B is a schematic diagram of a second control circuit for the embodiment illustrated in FIGS. 4 and 5.
Figure 6C:
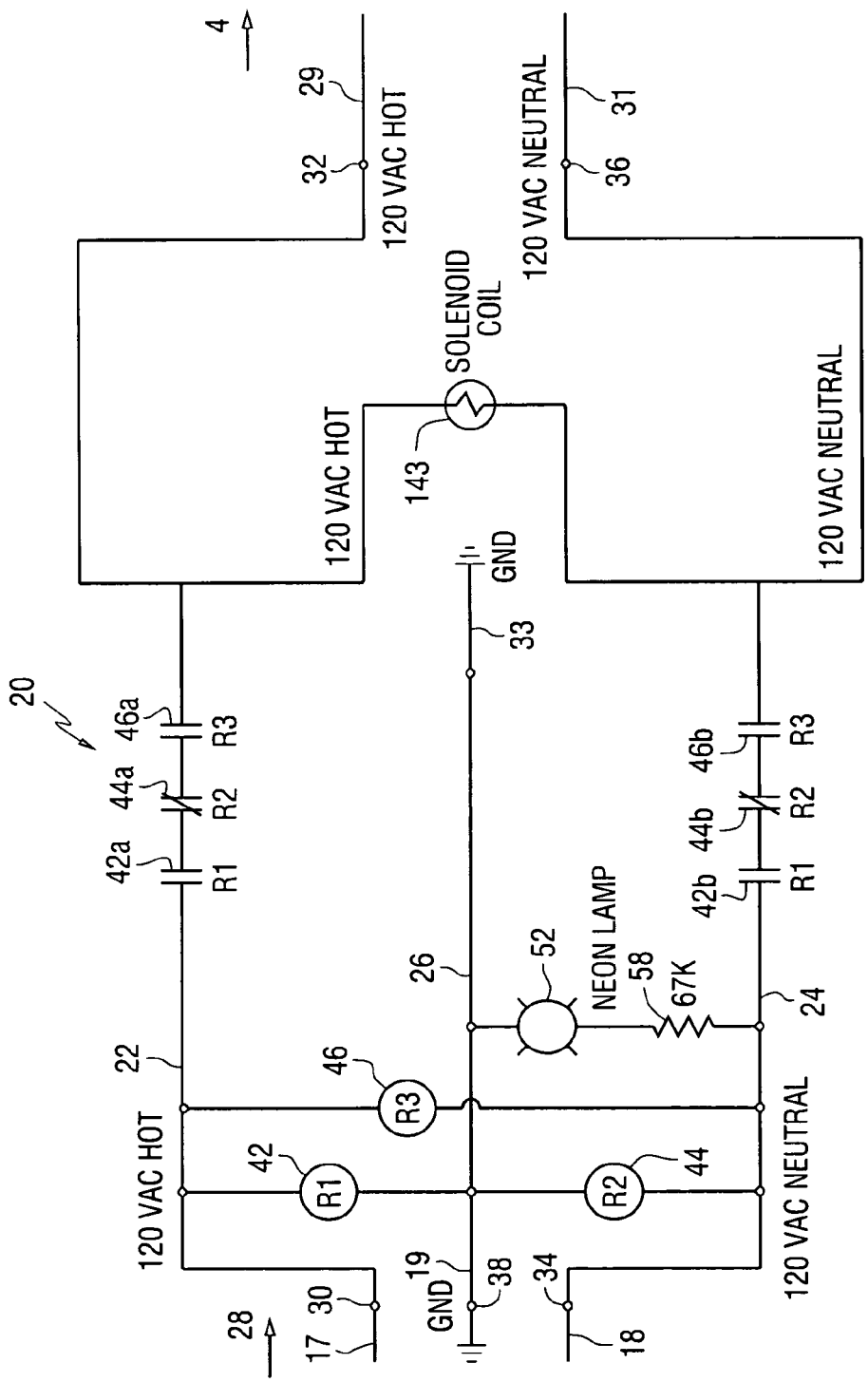
FIG. 6C is a schematic diagram of a third control circuit for the embodiment illustrated in FIGS. 4 and 5.
Figure 6D:
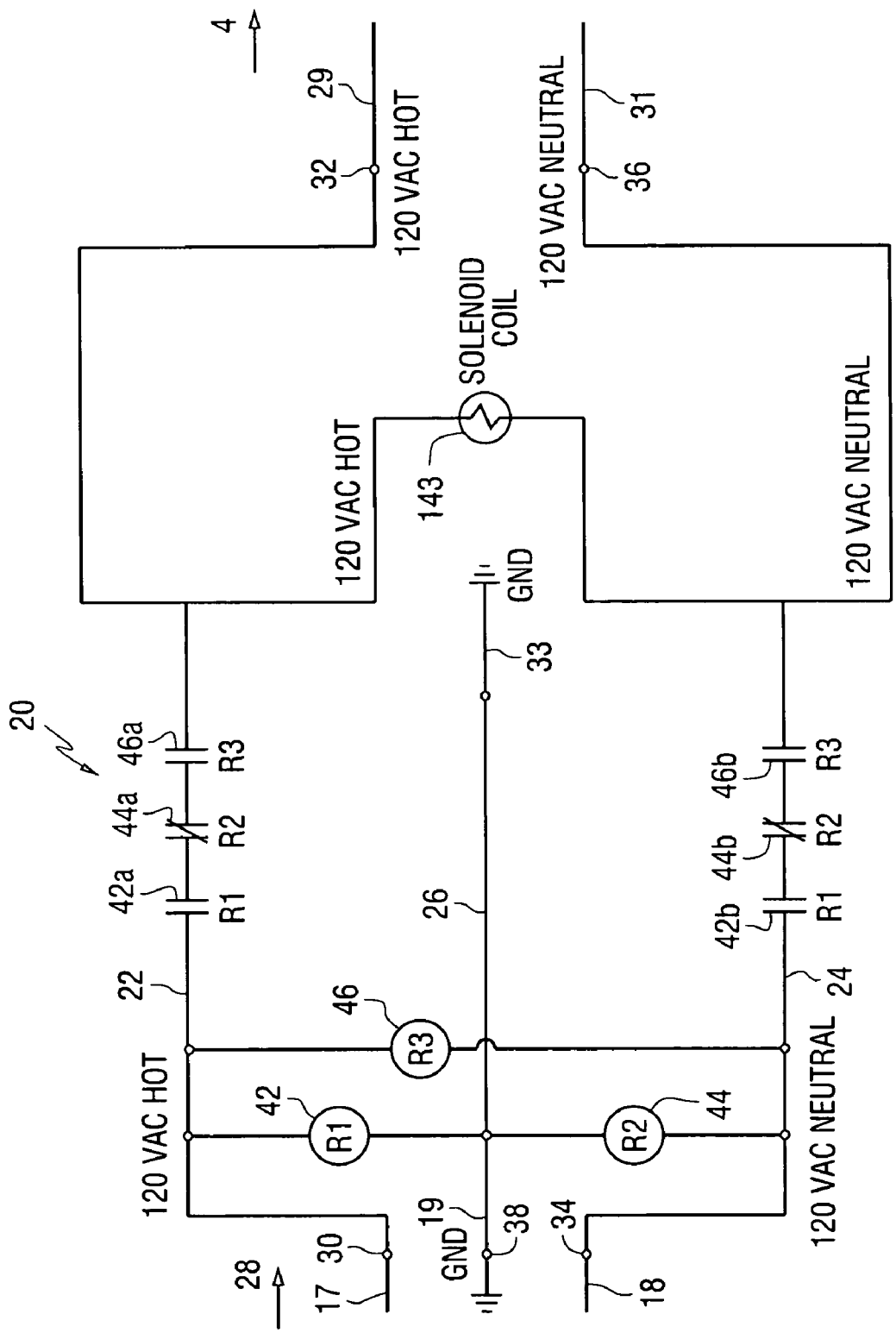
FIG. 6D is a schematic diagram of a fourth control circuit for the embodiment illustrated in FIGS. 4 and 5.

Electrical circuit 20, as shown in FIGS. 6A and 6B also includes three indicator lights, first, second, and third indicator lights 48, 50, 52 and their associated resistors, respectively, first, second, and third resistors 54, 56, 58. These indicator lights provide a visual indication of whether or not electrical source 28 is correctly wired. The embodiments illustrated in FIG. 6C utilizes only one indicator light for simplicity of understanding of the operator, while the embodiment of FIG. 6D has eliminated all such indicators.

First, second and third indicator lights 48, 50, 52 and their associated resistors 54, 56, 58 are to be selected to be compatible with the nominal voltage of electrical source 28. For example, where electrical source 28 is nominally 120 VAC, each of first, second and third lights 48, 50, 52 may be a 60 V neon lamps and each of first, second and third resistors 54, 56, 58 may be a 67 K, 0.25 watt resistor. The lamps may be used with colored lenses. It is preferred that first and second lamps 49, 50 be used with amber lenses and third lamp 52 be used with a red lens.

First indicator light 48 and first resistor 54 are electrically connected in series between first and second conductive lines 22, 24 so that first indicator light 48 glows if there is a voltage difference between these two conductive lines. Additionally, solenoid coil 143, which is in electrical connection with and provides the activation for active mode relay 144 is disposed between first and second conductive lines 22, 24, such that the solenoid coil 143 is activated only if there is a voltage difference between these two conductive lines. In the absence of a voltage difference, including the situation when no power is present in the circuit and conductive lines 22, 24 are at 0 volts, solenoid coil 143 is deactivated, causing active mode relay 143 to open, causing locking pawl 142 to release recess 118, and cause plug 110 to be released and the electrical connections physically and electrically disconnected. Second indicator light 50 and second resistor 56 are electrically connected in series between first and third conducive lines 22, 26 so that second indicator light 50 glows if there is a voltage difference between these two conductive lines. If electrical source 28 is correctly wired, both of these lights will glow. Third indicator light 52 and third resistor 58 are electrically connected in series between second and third conductive lines 24, 26 so that third indicator light 52 glows if there is a voltage difference between these two conductive lines. If the electrical source 28 is correctly wired, third indicator light 54 will not glow because second and third conductive lines 24, 26 will be connected, respectively, to the putative neutral and ground lines 18, 19 of electrical source 28 which are nominally at the same voltage potential. Third indicator light 52 will only glow if electrical source 28 is miswired so that one second and third conductive lines 24, 26 becomes electrically energized with respect to the other.

It is also to be understood that embodiments of the present invention are not limited to those which utilize sensors coils to detect miswiring of the electrical supply. Any type of electronic sensor known to those skilled in the art that is capable of detecting whether or not the electrical supply is miswired is within the contemplation of the present invention. For example, such electronic sensors include, but are not limited to, voltage sensors, current sensors, and magnetic flux sensors. Likewise, embodiments of the present invention are not limited to mechanical switches for controlling the electrical continuity between an electrical line of the electrical source and a corresponding line of the appliance. Any type of switch known to one skilled in the art is within contemplation of the present invention. For example, such switches also include, but are not limited to, semiconductor switches. Moreover, the switches may be self-resetting or require externally initiated resetting, for example, manual resetting. Additionally, it is to be understood, that there may be intermediate devices and/or electronic circuits between the sensors and the switch or switches which the sensor or sensors control. It is also to be understood that a miswiring condition may be determined by a sensor either acting alone or in combination with other sensors.

Embodiments of the present invention also include methods for preventing a miswiring condition in an electrical source from causing an appliance that is to be electrically supplied by the electrical source from being an electrocution hazard, especially where the miswiring condition causes the putative ground wire of the electrical source to be electrically energized. Such methods include the steps of detecting whether the putative ground wire of the electrical source is electrically energized and, if it is electrically energized, precluding electrical continuity between the putative ground wire of the electrical source and the ground wire of the appliance. In some embodiments, the detection of whether the putative ground wire is electrically energized involves sensing the voltage of the putative ground line of the electrical source in relation to that of at least one of the putative hot line and the putative neutral line of the electrical source to detect a miswiring condition of the electrical source. In some embodiments, the detection also includes detecting if there is a voltage difference between the putative hot and neutral lines of the electrical source. Some embodiments additionally include the steps of precluding electrical continuity between the putative hot wire of the electrical supply and the hot wire of the appliance and/or between the putative neutral wire of the electrical source and the neutral wire of the appliance. Furthermore, some embodiments include the steps of detecting if the putative ground line of the electrical source is open, and if it is detected to be open, then precluding electrical continuity between the putative hot wire of the electrical source and the hot wire of the appliance.

In addition to detecting if the putative ground wire of the electrical source is electrically energized, some embodiments also include the steps of detecting if the putative neutral wire of the electrical source is electrically energized and, if it is electrically energized, precluding electrical continuity between the putative neutral line of the electrical source and the neutral line of the appliance. In some of these embodiments, the determination of whether the putative neutral wire of the electrical source is electrically energized involves sensing the voltage of the putative neutral line of the electrical source in relation to that of at least one of the putative hot line and the putative ground line of the electrical source. Some embodiments further comprise the step of precluding electrical continuity between the putative hot line of the electrical supply and the hot line of the appliance if the putative neutral line of the appliance is detected to be electrically energized as an added precaution against any electrical power being conducted to the appliance.

Furthermore, some method embodiments include a step of displaying the wiring condition of the electrical source. For example, the displaying step may be performed by using a combination of the on-off states of a plurality of display lights, such as first, second, and third indicator lights 48, 50, 52, as depicted in FIG. 2, to display the wiring condition of the electrical source, such as electrical source 28.

Some method embodiments may be carried out by interposing a protection device 12, configured in any of the configurations illustrated in FIGS. 1A-G, between an electrical supply 28 having an electrical circuit such as first electrical circuit 20, and an appliance 4, such that the components of first electrical circuit 20 would detect a miswiring in electrical source 28 and preclude electrical continuity through one or more of first, second, and third conductive lines 22, 24, 26.

Figure 7:
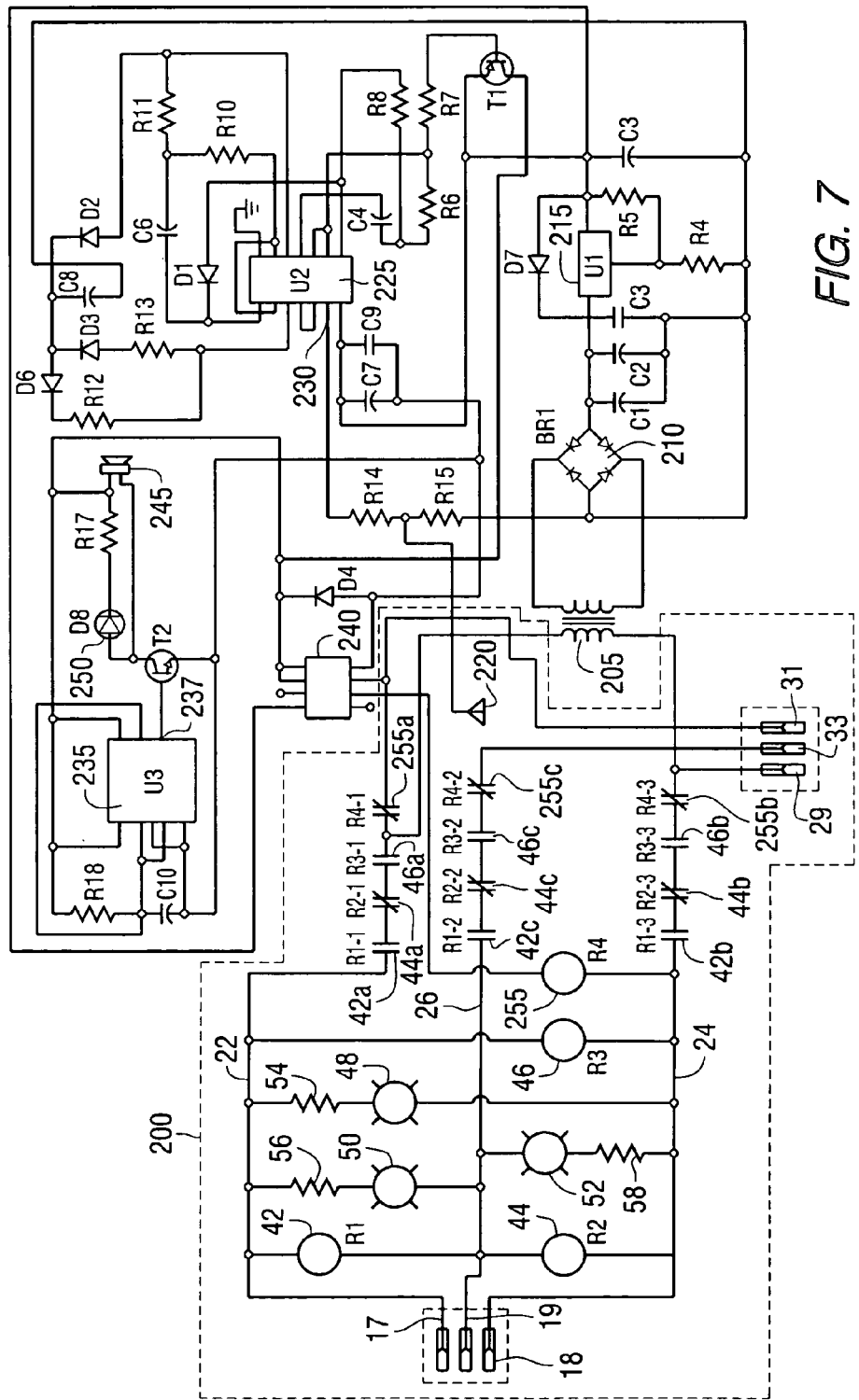
FIG. 7 is an electrical schematic diagram of a third embodiment of the device which specifically detects a situation where the polarity of the two main leads are reversed and the putative ground line of the electrical supply is improperly electrically charged or is not properly connected.

Referring now to FIG. 7, relay circuit 100 is essentially provided in accordance with the general descriptions of the previous embodiments. The embodiment illustrated in FIG. 7, while incorporating many features of the previous embodiments, is intended to address the specific issue of the situation where the polarity of the two main leads are reversed and the putative ground line of the electrical supply is improperly electrically charged or is not properly connected. Transformer 205 is utilized to step down the 120 VAC line voltage to control voltage which is preferably 6±1 volt. Rectification circuit 210 is utilized to convert the AC signal to DC for the control circuitry. First regulator 215, which is preferably an LM 317 regulator, limits the voltage of the control circuitry to the prescribed range and target for the protection of the components. Associated with first regulator 215 is a conventional array of capacitors, resistors and diodes to filter the DC voltage and maintain a nominal 3 volt output.

Figure 7A:
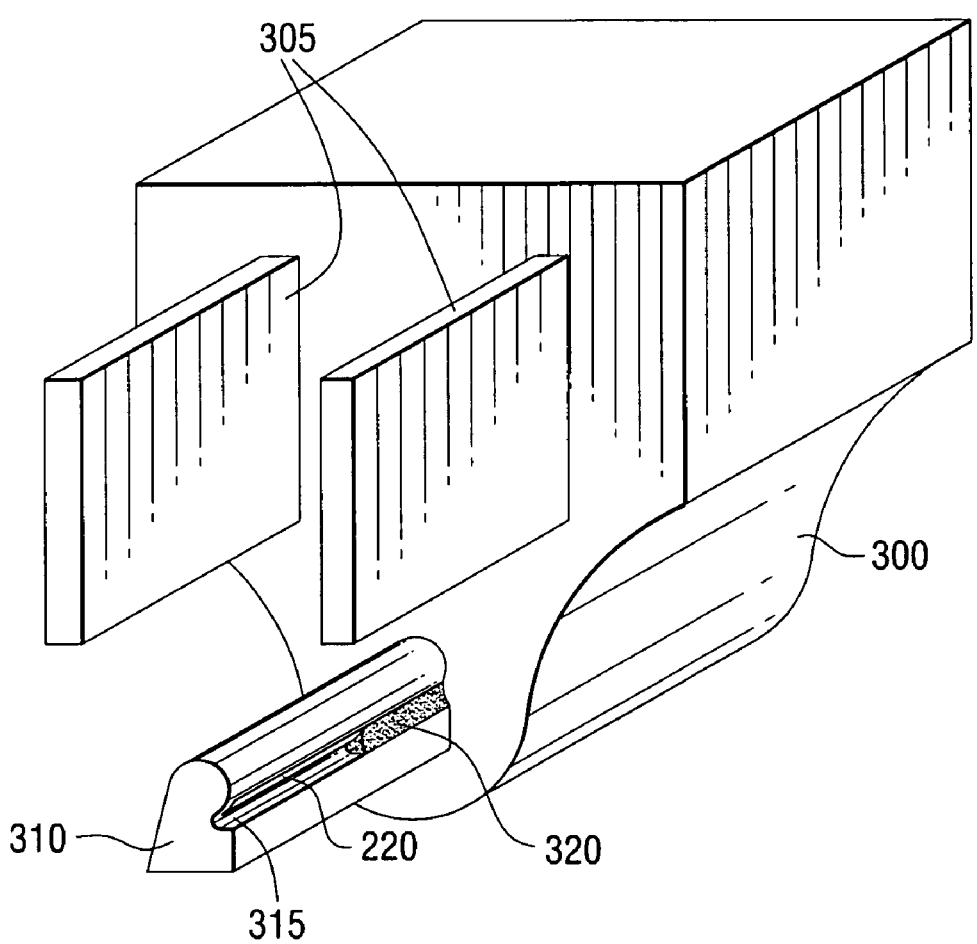
FIG. 7A is an isometric diagram of an electrical connector utilized in conjunction with the third embodiment of the device.

A probe 220 is affixed or otherwise placed in electrical connection to the ground lead in order to detect the sine wave input, if any, present on the ground lead of the receptacle or other voltage source. First detector 225 detects the presence of a sine wave signal on the input pin 230 from probe 220 and convert it to an output signal. First detector 225, a Schmidt trigger, is also utilized in conjunction with a conventional circuit which amplifies the waveform input from probe 220 and establishes a biasing sensitivity therefor. The probe size, and resultant resistivity, is also a factor in determining the sensitivity of the circuit to the presence of electrical voltage in or near the probe 220. Referring now to FIGS. 7 and 7A, the probe 220 may be adapted to be encased within the ground pin of a conventional three prong electrical plug. The plug 300 is provided with the typical triangular arrangement of hot and common blades 305 and ground pin 310. A channel 315 is provided within the ground pin 310 and the probe 220 is inserted therein. Insulating compound 320, shown partially filling channel 315 for illustrative purposes, is utilized to maintain probe 220 within channel 315 without electrical or physical contact with ground pin 310 or any surrounding contact, such as from within the electrical receptacle. Under normal conditions, insulating compound 320 will fill the entirety of channel 315. Insulating compound 320 may be of any nonconductive material and is preferably plastic. In this embodiment, the probe 220 is preferably 0.010 inches in diameter to provide the proper sensitivity for the voltages being sensed within a standard 110 v outlet. The output signal from first detector 225 is transmitted to timing circuit 235 and energizes the circuit to operate relay circuit 240. Timing circuit 235 is of a conventional design and will also transmit an additional output signal from pin 237 to create an audible signal from speaker 245 and light emitting diode 250. Relay circuit 240, when detecting the output signal from timing circuit 235, will energize a fourth three-pole double-throw relay which includes second sensing coil 255 and normally-closed contact switches 255a, 255b, 255c. Fourth sensing coil 255 is electrically connected across second conductive line 24 and the output pin of relay circuit 240. Fourth contact switches 255a, 255b, 255c, are located, respectively, within first, second, and third conductive lines 22, 24, 26. When normally-closed fourth contact switches 255a, 255b, 255c are opened by fourth sensing coil 255 becoming energized by a voltage difference between second conductive line 24 and relay circuit 240, they break the electrical continuity of, respectively, first, second, and third conductive lines 22, 24, 26.

A test switch may optionally be included in the circuit to energize fourth sensing coil 255. To reset the detection circuitry, the test unit must be disconnected from any AC voltage input.

Figure 8:
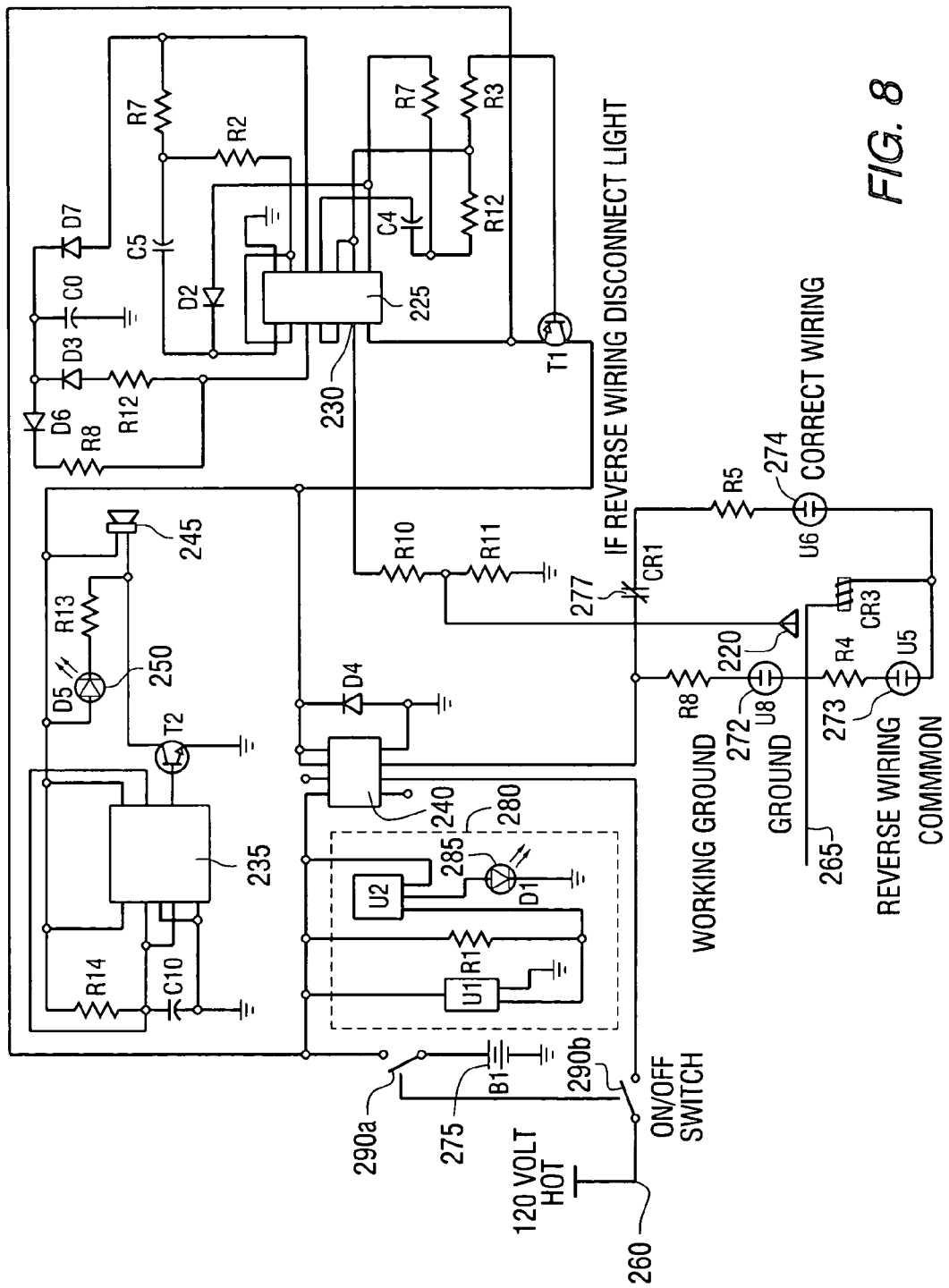
FIG. 8 is an electrical schematic diagram of a tester device incorporating the embodiment of FIG. 7.

A tester device may also be provided incorporating the circuitry illustrated in FIG. 8. Preferably this is a hand held device which may be plugged into a wall outlet or otherwise affixed to a source of electrical power to detect the miswiring condition. The circuitry operates in a like manner to the embodiment identified with respect to FIG. 7, with the following notable exceptions and additions. AC voltage input is provided through putative hot lead 260, putative ground lead 265 and putative neutral lead 270. In the absence of any voltage on the putative hot lead 260, a source of electrical energy, preferably in the form of a battery 275, is provided to energize the circuit. Nominally the circuit is operated at 3.0 volts and in order to avoid anomalous output, a low voltage detector circuit 280 is provided with a low voltage indicator light in the form of LED 285 if the battery voltage drops below approximately 1.75 volts. Switches 290a, b are provided to disconnect the battery to preserve battery life when the unit is not in use.

In comparison to the embodiment of FIG. 7, the detection of the miswiring condition does not trigger a relay coil, but operates a series of indicator lights 272, 273 and 274. In the event that a reverse wiring, hot ground situation is encountered, LED 250 and speaker 245 emit the appropriate alarms and relay 277 disconnects LED 274, which would otherwise erroneously report a correct condition. The tester embodiment also reports the standard array of miswiring schemas, being a normal condition when hot lead 260 is energized, and ground lead 265 and common lead 270 are both grounded. In the event that the hot lead 260 and common lead 270 are reversed, LED 273 is energized. A properly attached ground lead will cause indicator LED 272 to light when hot lead 260 is properly energized.

While only a few embodiments of the present invention have been shown and described, it will be obvious to those skilled in the art that many changes and modifications may be made thereunto without departing from the spirit and scope of the invention as described in the following claims.

What is claimed is:

1. An electrical circuit for detection of improper wiring of a three lead power supply, having leads of equal resistance, comprising:
    a sensor circuit for detecting the absence of electrical current in a putative hot lead of said three lead power supply;
    a sensor circuit for detecting the simultaneous presence of a source of electrical current in both of the putative ground lead and putative neutral lead of said three lead power supply; wherein the putative ground lead is in electrical communication with the putative neutral lead, causing the putative ground lead to be electrified as well
    an independent ground circuit in electrical communication with said sensor circuits for directing electrical current from said sensor circuits to earth; and
    an indicator circuit for generating a unique response signal specifically indicating the absence of electrical current in the putative hot lead, simultaneously with the presence of a source of electrical current in said putative ground and neutral leads, said indicator circuit being formed, in part, by said independent ground circuit and utilizing an independent power source to generate said unique response signal.

2. An electrical circuit as described in claim 1, wherein said response signal triggers the termination of electrical continuity in at least one of the three leads.

3. An electrical circuit as described in claim 2, wherein said response signal triggers the termination of electrical continuity in the ground lead.

4. An electrical circuit as described in claim 2, wherein said response signal triggers the termination of electrical continuity in all three leads.

5. An electrical circuit as described in claim 1, wherein said response signal triggers at least one sensory indicator selected from the group consisting of a visual indicator and an audible indicator.

6. An electrical circuit as described in claim 1, wherein said circuit is incorporated into the power supply circuitry of an electrically powered device.

7. An electrical circuit as described in claim 1, wherein said circuit is incorporated into a test device comprising a plug for insertion into an electrical outlet and at least one sensory indicator.

8. An electrical circuit as described in claim 7, wherein said response signal triggers at least one sensory indicator selected from the group consisting of a visual indicator and an audible indicator.

9. An electrical circuit as described in claim 1, wherein said sensor circuit for detecting the presence of electrical current in a putative ground lead of said three lead power supply further comprises a probe circuit which is mounted adjacent a ground pin for insertion into an electrical outlet.

10. A method for detection of improper wiring of a three lead power supply, having leads of equal resistance the method comprising:
    detecting the absence of electrical current in a putative hot lead of said three lead power supply;
    detecting the simultaneous presence of a source of electrical current in both of the putative ground lead and putative neutral lead of said three lead power supply for therein; wherein the putative ground lead is in electrical communication with the putative neutral lead, causing the putative ground lead to be electrified as well
    introducing a second, independent source of power and independent ground circuit; and
    generating, utilizing said independent source of power and independent ground circuit, a unique response signal specifically indicating when, in the as-wired condition, the absence of electrical current is detected in the putative hot lead simultaneously with the presence of a source of electrical current in both of said putative ground and neutral leads.

11. A method as described in claim 10, wherein generating said response signal triggers the additional step of termination of electrical continuity in at least one of the three leads.

12. A method as described in claim 11, wherein generating said response signal triggers the additional step of termination of electrical continuity in the ground lead.

13. A method as described in claim 11, wherein generating said response signal triggers the additional step of termination of electrical continuity in all three leads.

14. A method as described in claim 10, wherein generating said response signal triggers the additional step of initiating at least one sensory indication selected from the group consisting of a visual indication and an audible indication.

* * * * *